(12) United States Patent
Kobayashi et al.

(10) Patent No.: US 11,398,762 B2
(45) Date of Patent: Jul. 26, 2022

(54) ELECTRIC PUMP DEVICE

(71) Applicant: NIDEC TOSOK CORPORATION, Kanagawa (JP)

(72) Inventors: Yoshiyuki Kobayashi, Kanagawa (JP);
Hitoshi Sakamoto, Kanagawa (JP);
Tomohiro Sakata, Kanagawa (JP);
Chisato Sekiguchi, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 316 days.

(21) Appl. No.: 16/581,778

(22) Filed: Sep. 25, 2019

(65) Prior Publication Data

US 2020/0106330 A1   Apr. 2, 2020

(30) Foreign Application Priority Data

Sep. 28, 2018 (JP) .............................. JP2018-185800
Aug. 6, 2019 (JP) .............................. JP2019-144288

(51) Int. Cl.
| | |
|---|---|
| *H02K 5/22* | (2006.01) |
| *H02K 5/24* | (2006.01) |
| *H02K 5/16* | (2006.01) |
| *F04B 17/03* | (2006.01) |
| *F04D 25/06* | (2006.01) |
| *H02K 1/27* | (2022.01) |
| *H02P 27/06* | (2006.01) |

(52) U.S. Cl.
CPC ............ *H02K 5/225* (2013.01); *F04B 17/03* (2013.01); *F04D 25/068* (2013.01); *H02K 5/24* (2013.01); *H02P 27/06* (2013.01)

(58) Field of Classification Search
CPC ............ H02K 5/225; H02K 5/24; H02K 5/16;
H02K 1/2706; H02K 3/522; H02K 2213/03; H02K 7/14; H02K 11/33; F04B 17/03; F04D 25/068; F04C 2240/403; F04C 2210/206; F04C 2240/808; F04C 2/102
USPC ........................................ 310/68 B, 68 R, 71
See application file for complete search history.

(56) References Cited

U.S. PATENT DOCUMENTS

| | | | |
|---|---|---|---|
| 9,982,922 B2 | 5/2018 | Sakai et al. | |
| 2015/0115765 A1 | 4/2015 | Ko et al. | |
| 2015/0139831 A1* | 5/2015 | Yoon ...................... | F04C 2/102 417/420 |
| 2015/0338143 A1 | 11/2015 | Sakai et al. | |

(Continued)

FOREIGN PATENT DOCUMENTS

JP         2016118183      6/2016

OTHER PUBLICATIONS

"Office Action of Related U.S. Appl. No. 16/581,788", dated Sep. 21, 2021, pp. 1-11 (Yoshiyuki Kobayashi et al., "Electric Pump Device", U.S. Appl. No. 16/581,788, filed Sep. 25, 2019.).

*Primary Examiner* — John K Kim
(74) *Attorney, Agent, or Firm* — JCIPRNET

(57) ABSTRACT

An electric pump device is provided. The electric pump device includes a motor, an inverter substrate electrically connected to the motor, a housing for housing the motor and the inverter substrate, and a pump portion driven by power of the motor. The housing includes a motor housing portion for housing the motor and an inverter housing portion for housing the inverter substrate. The motor housing portion has strut portions which extend inside the inverter housing portion and fixed to the inverter substrate.

13 Claims, 12 Drawing Sheets

(56) References Cited

U.S. PATENT DOCUMENTS

| | | | |
|---|---|---|---|
| 2016/0076539 A1* | 3/2016 | Chikaoka | H02K 5/1732 |
| | | | 417/410.4 |
| 2016/0094110 A1 | 3/2016 | Drye et al. | |
| 2016/0245283 A1* | 8/2016 | Chikaoka | F04C 13/008 |
| 2016/0268875 A1* | 9/2016 | Roos | F16H 61/0006 |
| 2017/0321794 A1* | 11/2017 | Kiehlneker | F04C 2/10 |
| 2017/0374758 A1* | 12/2017 | Park | H01G 2/08 |
| 2019/0053368 A1* | 2/2019 | Motohashi | H05K 5/006 |
| 2019/0195347 A1* | 6/2019 | Kataoka | F04B 17/03 |
| 2019/0273416 A1* | 9/2019 | Kizu | H02K 5/1732 |
| 2019/0276071 A1* | 9/2019 | Nagashima | H02P 25/22 |
| 2020/0049249 A1* | 2/2020 | Iwase | F04C 15/0096 |
| 2020/0067381 A1 | 2/2020 | Suzuki et al. | |
| 2020/0106330 A1* | 4/2020 | Kobayashi | F04B 53/16 |
| 2020/0106331 A1 | 4/2020 | Kobayashi et al. | |

\* cited by examiner

ELECTRIC PUMP DEVICE

CROSS-REFERENCE TO RELATED APPLICATION

This application claims the priorities of Japan patent application serial no. 2018-185800, filed on Sep. 28, 2018 and no. 2019-144288 filed on Aug. 6, 2019. The entirety of the above-mentioned patent applications are hereby incorporated by reference herein and made a part of this specification.

BACKGROUND

Technical Field

The disclosure relates to an electric pump device. This application claims priority based on Japanese Patent Application No. 2018-185800 filed on Sep. 28, 2018, and contents thereof are incorporated herein.

Related Art

The electric pump device includes a motor, a substrate, a housing, and a pump. In an electric compressor of patent literature 1, a base member is fixed to a motor housing, and a multilayer substrate is fixed to a pedestal which is formed in a manner of protruding from a flat portion of the base member into a drive device housing portion.

LITERATURE OF RELATED ART

Patent Literature

[Patent literature 1] Japanese Laid-Open Publication No. 2016-118183

In a fixing structure of a conventional substrate, there is room for improvement in terms of suppressing substrate vibration. If vibration damping performance of the substrate is low, durability of solders which join coil end portions of the motor and the substrate may be affected.

SUMMARY

One aspect of the electric pump device of the disclosure includes: a motor; an inverter substrate electrically connected to the motor; a housing for housing the motor and the inverter substrate; and a pump portion driven by power of the motor. The housing includes a motor housing portion for housing the motor, and an inverter housing portion for housing the inverter substrate. The motor housing portion includes at least one strut portion fixed to the inverter substrate and extending in the inverter housing portion.

DESCRIPTION OF THE EMBODIMENTS

Figure 1:
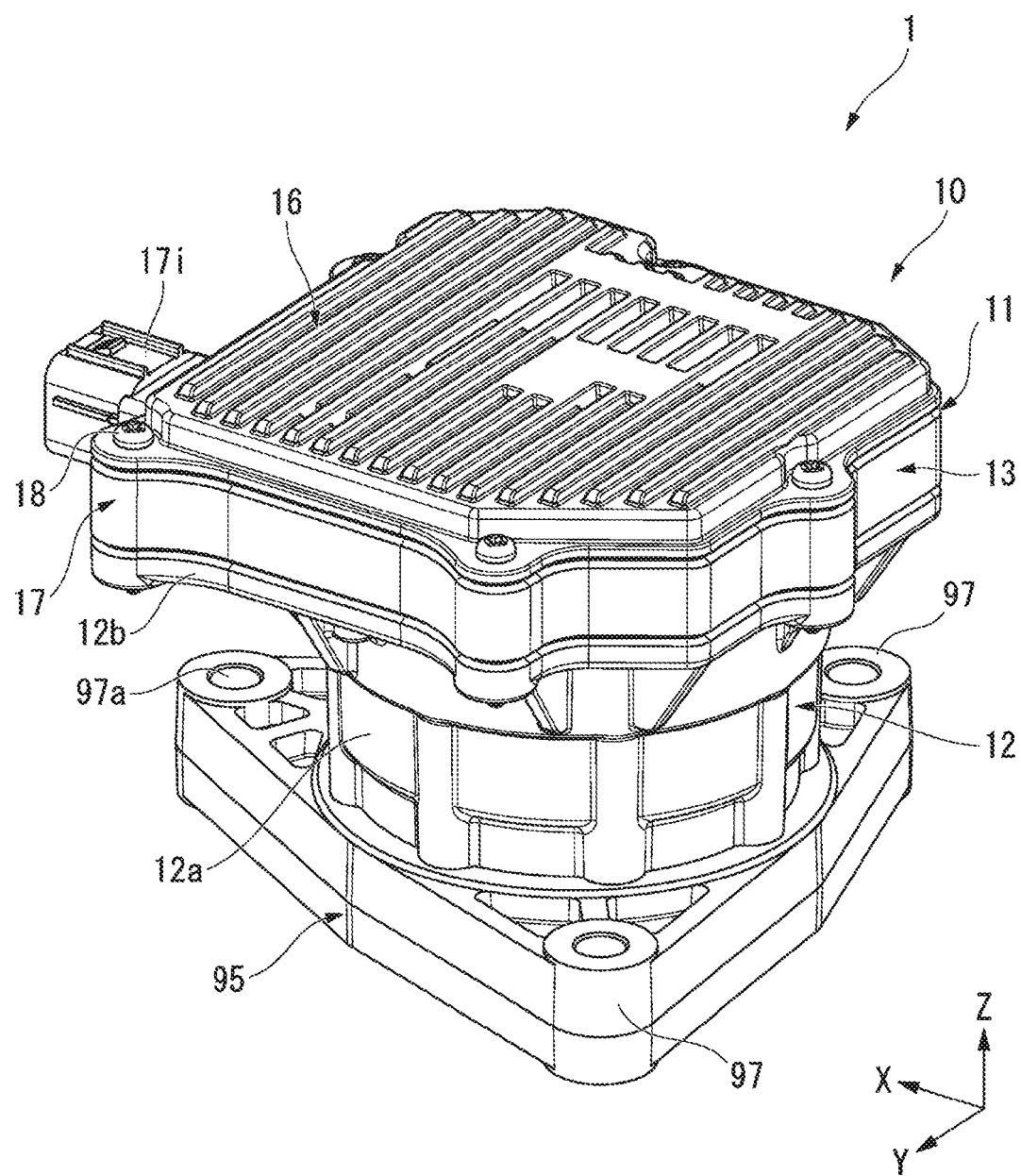
FIG. 1 is a perspective view showing a motor unit and an electric pump device of a first embodiment.
Figure 2:
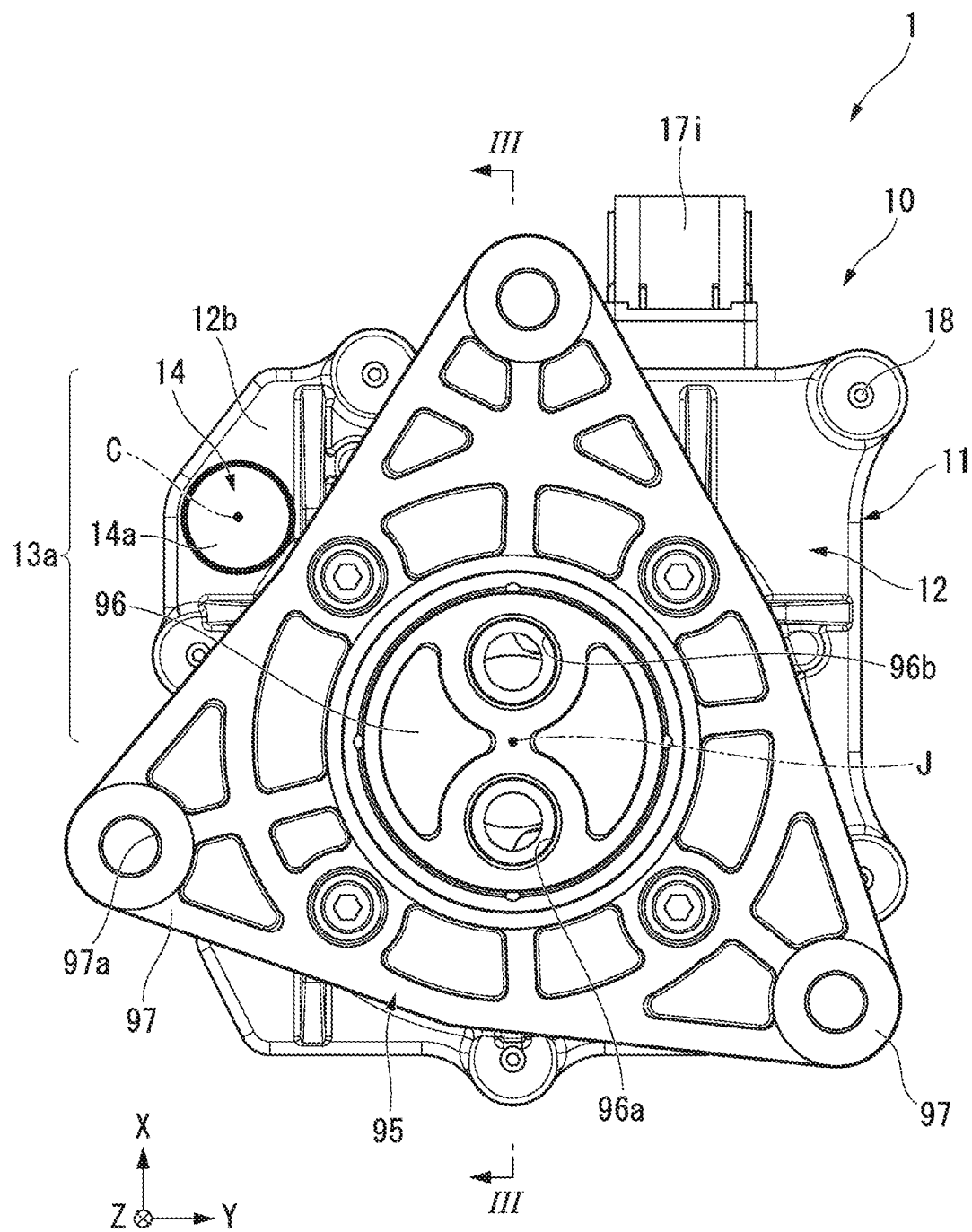
FIG. 2 is a front view showing the motor unit and the electric pump device of the first embodiment.
Figure 3:
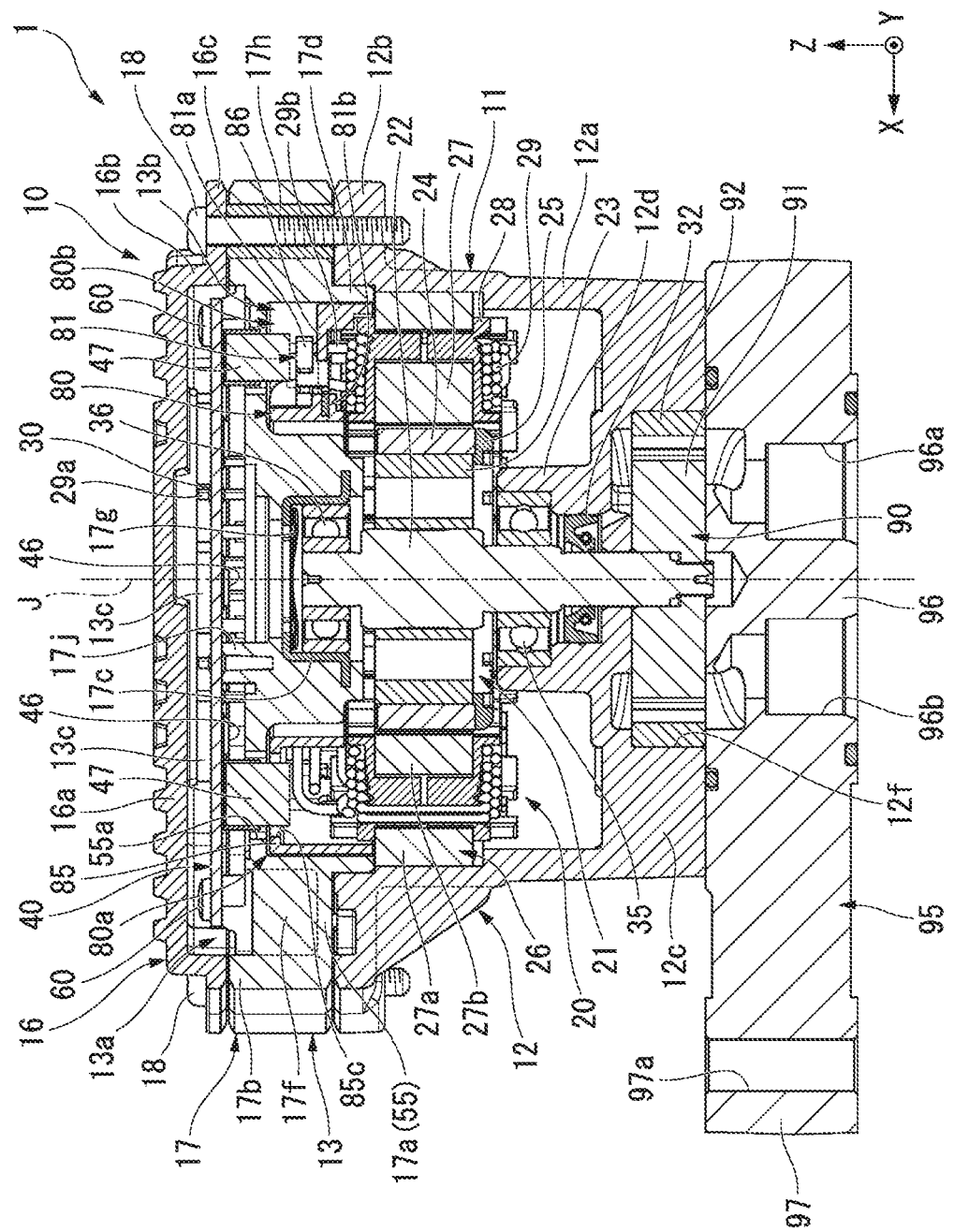
FIG. 3 is a longitudinal section view showing a III-III section in FIG. 2.
Figure 4:
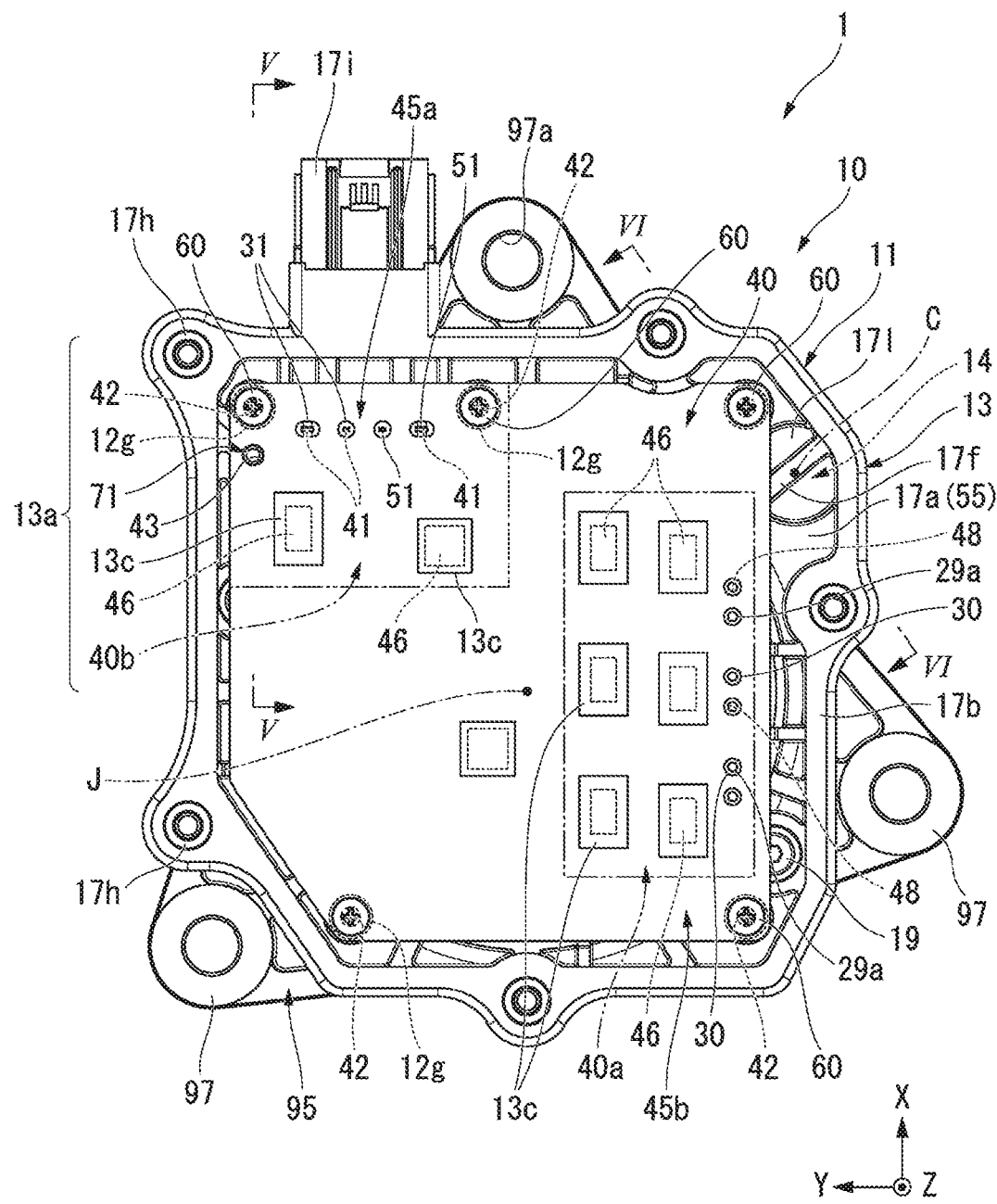
FIG. 4 is a rear view (plan view) showing the motor unit and the electric pump device of the first embodiment, and illustrates a state in which a first member and the like of an inverter housing portion are removed from the device.

In view of the above circumstances, the disclosure provides an electric pump device which can improve the vibration damping performance of an inverter substrate and can enhance the durability of solders which fix the coil end portions and the inverter substrate.

According to the electric pump device of one aspect of the disclosure, the vibration damping performance of the inverter substrate can be improved, and the durability of the solders which fix the coil end portions and the inverter substrate can be enhanced.

First Embodiment

A motor unit 10 of a first embodiment of the disclosure and an electric pump device 1 including the motor unit 10 will be described with reference to FIGS. 1-12. In the drawings, an XYZ coordinate system is appropriately shown as a three-dimensional orthogonal coordinate system. The motor unit 10 and the electric pump device 1 include a motor 20 and an inverter substrate 40. The motor 20 has a central axis J, and the central axis J extends along a Z-axis direction. In the following description, a direction parallel to the central axis J is simply referred to as an "axial direction" unless otherwise specified. An axial position of the motor 20 and an axial position of the inverter substrate 40 are different from each other. That is, the motor 20 and the inverter substrate 40 are aligned in the axial direction. In the axial direction, a direction from the motor 20 toward the inverter substrate 40 is referred to as one side in the axial direction (+Z side), and a direction from the inverter substrate 40 toward the motor 20 is referred to as the other side in the axial direction (−Z side). A radial direction centered on the central axis J is simply referred to as a "radial direction". In the radial direction, a direction approaching the central axis J is referred to as a radial inner side, and a direction away from the central axis J is referred to as a radial outer side. A circumferential direction centered on the central axis J, that is, a direction around the central axis J is simply referred to as a "circumferential direction". Moreover, in the embodiment, a "parallel direction" includes a substantially parallel direction, and an "orthogonal direction" includes a substantially orthogonal direction.

The electric pump device 1 of the embodiment sucks and discharges, for example, fluid such as oil or the like. The electric pump device 1 has, for example, a function of circulating the fluid through a flow path. When the fluid is oil, the electric pump device 1 may be referred to as an electric oil pump device. Although not particularly illustrated, the electric pump device 1 is arranged, for example, in a vehicle drive device or the like. That is, the electric pump device 1 is mounted on a vehicle.

As shown in FIGS. 1-9, the motor unit 10 includes a housing 11, fastening screws 18, fixing screws 19, the motor 20, the inverter substrate 40, wiring members 50, screw members 60, and coil supports 80. The electric pump device 1 includes the motor unit 10, a pump portion 90, and a pump cover 95. That is, the electric pump device 1 includes the housing 11, the fastening screws 18, the fixing screws 19, the motor 20, the inverter substrate 40, the wiring members 50, the screw members 60, the coil supports 80, the pump portion 90, and the pump cover 95. In the embodiment, a pair of plate surfaces of the inverter substrate 40 faces the axial direction. Of the pair of plate surfaces of the inverter substrate 40, one plate surface faces one side in the axial direction. Of the pair of plate surfaces of the inverter substrate 40, the other plate surface faces the other side in the axial direction. In the embodiment, "viewed from the axial direction" is synonymous with "in a plan view of the inverter substrate 40".

The housing 11 houses the motor 20 and the inverter substrate 40. The housing 11 has a motor housing portion 12, an oil seal 32, a shaft portion 33, an inverter housing portion 13, and a breather portion 14. The motor housing portion 12 houses the motor 20. In the embodiment, the motor housing portion 12 also houses the pump portion 90. That is, the housing 11 also houses the pump portion 90. According to the embodiment, since the motor 20 and the pump portion 90 are housed in the motor housing portion 12, a structure of the electric pump device 1 can be simplified. The electric pump device 1 can be easily assembled.

The motor housing portion 12 is made of metal. The motor housing portion 12 is configured by a single member. The motor housing portion 12 has a housing tube portion 12a, a collar portion 12b, a pump housing wall portion 12c, a bearing holding tube portion 12d, and strut portions 12g.

The housing tube portion 12a has a cylindrical shape extending in the axial direction. In the embodiment, the housing tube portion 12a has a cylindrical shape. The motor 20 is housed in the housing tube portion 12a. The collar portion 12b extends from an end portion on one side in the axial direction of the housing tube portion 12a toward the radial outer side. The collar portion 12b has a plate shape in which plate surface face the axial direction. In the embodiment, an external shape of the collar portion 12b is a substantially polygonal shape when viewed from the axial direction.

Figure 5:
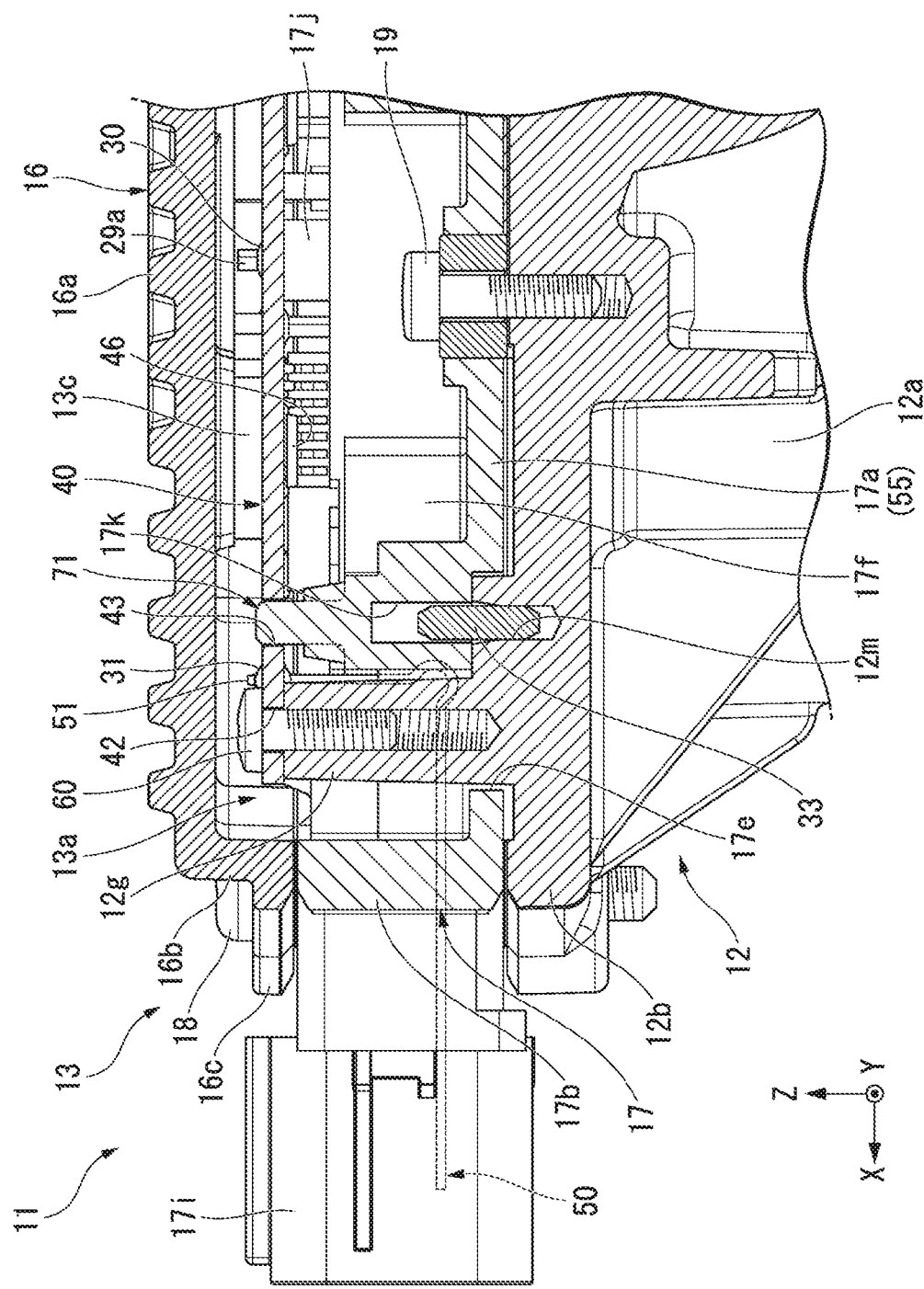
FIG. 5 is a longitudinal section view showing a V-V section in FIG. 4.
Figure 6:
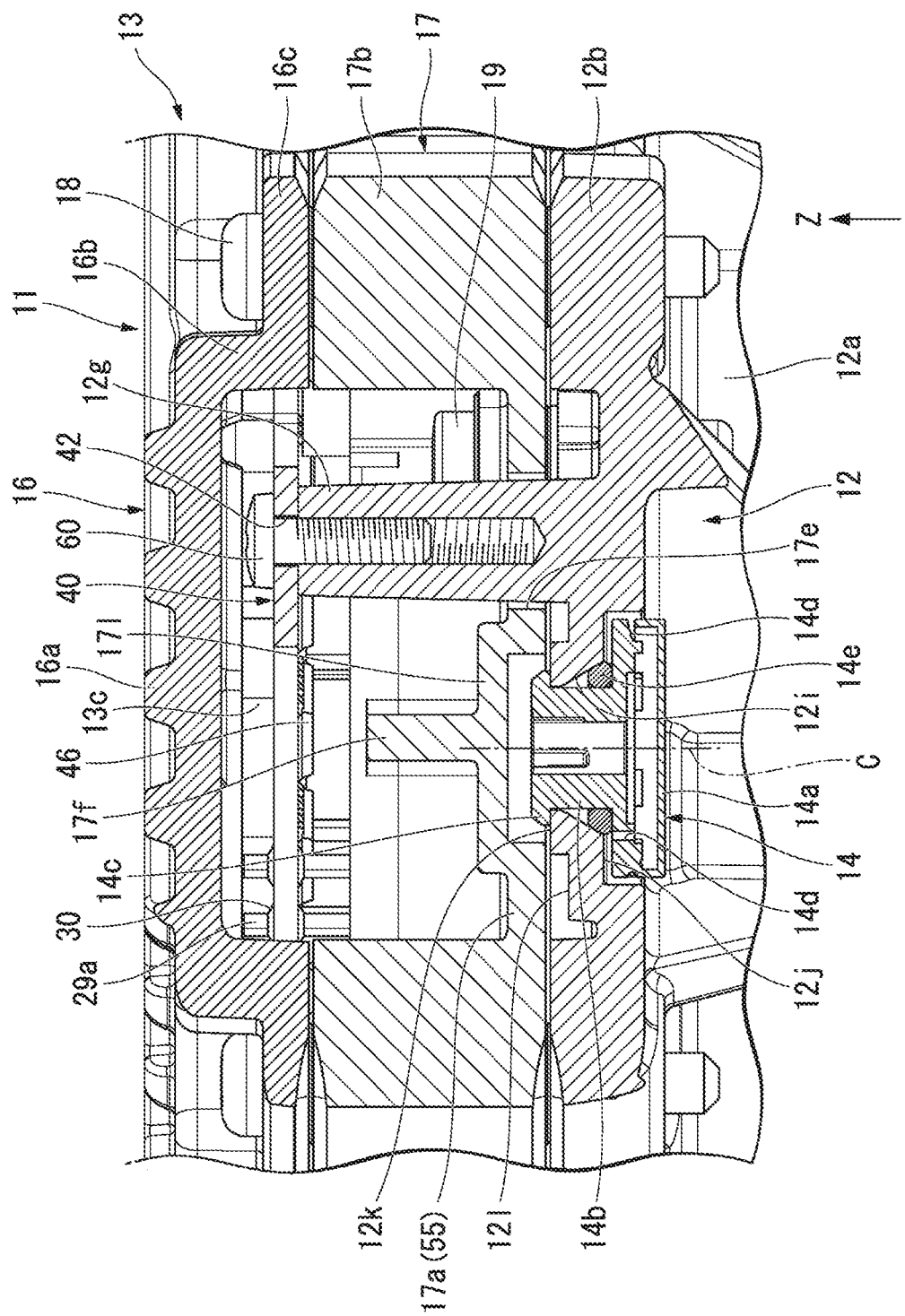
FIG. 6 is a longitudinal section view showing a VI-VI section in FIG. 4.
Figure 7:
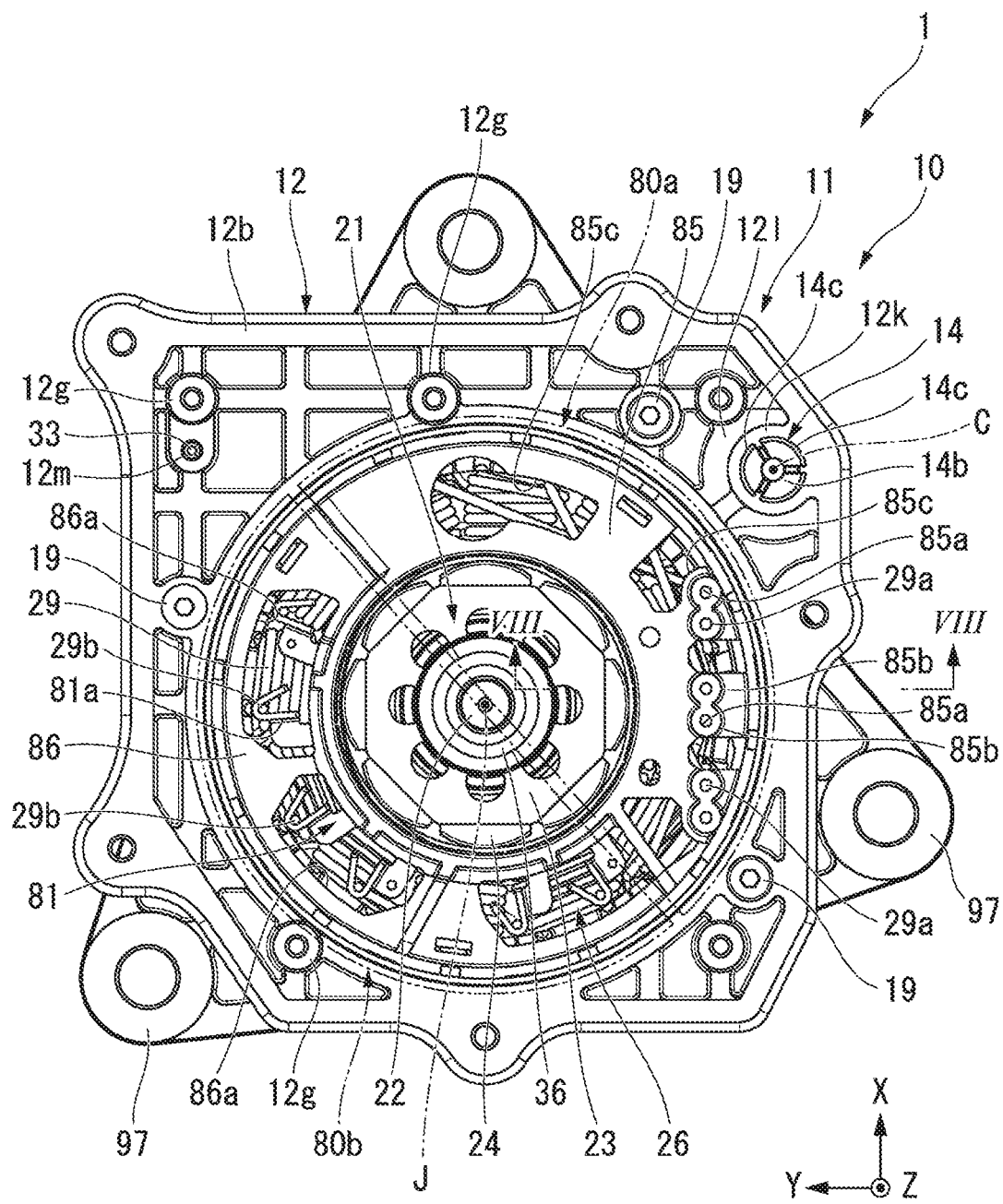
FIG. 7 is a rear view showing the motor unit and the electric pump device of the first embodiment, and illustrates a state in which the inverter housing portion, an inverter substrate, and the like are removed from the device.
Figure 8:
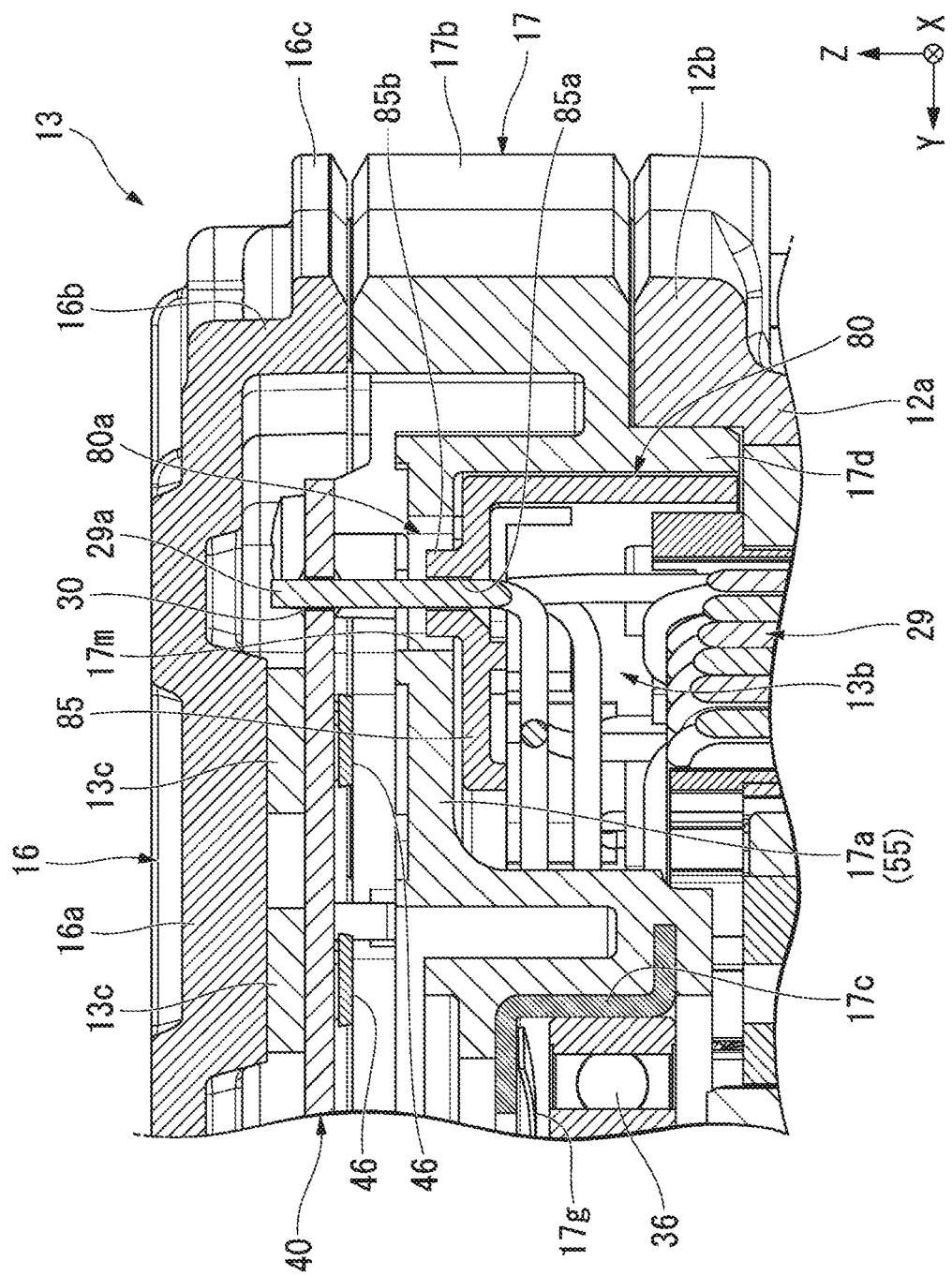
FIG. 8 is a longitudinal section view showing a VIII-VIII section in FIG. 7.

The collar portion 12b has a breather attachment hole 12i, a breather housing recess 12j, a claw portion support surface 12k, an outside surrounding surface 12l, and a shaft portion attachment hole 12m (see FIG. 5 and FIG. 6). The breather attachment hole 12i penetrates the collar portion 12b in the axial direction. The breather attachment hole 12i has a tapered hole-shaped part in which an inner diameter increases toward the other side in the axial direction. The breather attachment hole 12i overlaps a wiring member arrangement region 13a described later when viewed from the axial direction.

The breather housing recess 12j is recessed from a surface of the collar portion 12b facing the other side in the axial direction toward the one side in the axial direction. When viewed from the axial direction, the breather housing recess 12j has a circular ring shape. An inner diameter of the breather housing recess 12j is larger than the inner diameter of the breather attachment hole 12i. A bottom surface of the breather housing recess 12j facing the other side in the axial direction is connected to the inner peripheral surface of the breather attachment hole 12i.

The claw portion support surface 12k is arranged on a surface of the collar portion 12b facing one side in the axial direction. In the embodiment, the claw portion support surface 12k is a flat surface perpendicular to the central axis J. The claw portion support surface 12k has a substantially annular shape when viewed from the axial direction, and surrounds the breather attachment hole 12i from the outside (see FIG. 7). An inner peripheral portion of the claw portion support surface 12k is connected to an end portion (an opening portion) of the breather attachment hole 12i on one side in the axial direction.

The outside surrounding surface 12l is arranged on the surface of the collar portion 12b facing one side in the axial direction. The outside surrounding surface 12l has a substantially C-shape when viewed from the axial direction. The outside surrounding surface 12l surrounds the claw portion support surface 12k from the outside of a breather radial direction when viewed from the axial direction. Moreover, as described later, the breather radial direction is a radial direction centered on a breather central axis C. The outer peripheral surface 12l is positioned closer to the other side in the axial direction than the claw portion support surface 12k. That is, an axial position of the outer peripheral surface 12l is closer to the other side in the axial direction than an axial position of the claw portion support surface 12k.

The shaft portion attachment hole 12m is recessed from the surface of the collar portion 12b facing one side in the axial direction toward the other side in the axial direction. The shaft portion attachment hole 12m extends in the axial direction. The shaft portion attachment hole 12m has a circular hole shape.

The pump housing wall portion 12c is arranged on an end portion of the housing tube portion 12a on the other side in the axial direction. The pump housing wall portion 12c is disposed inside the housing tube portion 12a. The pump housing wall portion 12c blocks an opening on the other side in the axial direction of the housing tube portion 12a. The pump housing wall portion 12c has a plate shape in which plate surfaces face the axial direction. In the embodiment, the pump housing wall portion 12c has a substantially disc shape. The pump housing wall portion 12c houses the pump portion 90. The pump housing wall portion 12c has a pump housing hole 12f and a plurality of lightening holes (not shown).

The pump housing hole 12f is recessed from the plate surface of the pump housing wall 12c facing the other side in the axial direction toward the one side in the axial direction. In the embodiment, the pump housing hole 12f has a circular hole shape. The pump housing hole 12f is disposed at a center portion of the pump housing wall portion 12c when viewed from the axial direction. Although not particularly illustrated, the plurality of lightening holes is recessed from the plate surface of the pump housing wall portion 12c facing the one side in the axial direction toward the other side in the axial direction, and are arranged apart from each other in the circumferential direction. The plurality of lightening holes is arranged on the radial outer side of the pump housing hole 12f.

The bearing holding tube portion 12d has a tubular shape extending from the pump housing wall portion 12c toward the one side in the axial direction. The bearing holding tube portion 12d protrudes from the plate surface of the pump housing wall portion 12c facing the one side in the axial direction toward the one side in the axial direction. The bearing holding tube portion 12d holds first bearings 35 described later of the motor 20. The first bearings 35 are bearings positioned on the other side in the axial direction of a rotor core 23 described later, among a plurality of bearings 35 and 36 which are arranged apart from each other in the axial direction in the motor 20. The first bearing 35 are fitted into the bearing holding tube portion 12d.

The strut portions 12g extend in the axial direction. The strut portions 12g are disposed in the collar portion 12b and extend from the collar portion 12b toward the one side in the axial direction. The strut portions 12g protrude from the plate surface of the collar portion 12b facing the one side in the axial direction toward the one side in the axial direction. A plurality of the strut portions 12g is arranged. The plurality of strut portions 12g are arranged apart from each other in the circumferential direction when viewed from the axial direction. Specifically, when viewed from the axial direction, that is, in the plan view of the inverter substrate 40, the plurality of strut portions 12g is arranged apart from each other at positions overlapping an outer peripheral portion of the inverter substrate 40.

In the embodiment, the strut portions 12g have a substantially cylindrical shape. The strut portions 12g have outer diameters which decrease toward the one side in the axial direction. Outer peripheral surfaces of the strut portion 12g have a taper shape. The strut portions 12g have female screw portions on inner peripheral surfaces of the strut portions 12g. End surfaces of the strut portions 12g facing the one side in the axial direction have a flat surface shape perpendicular to the central axis J. The end surfaces of the strut portions 12g facing the one side in the axial direction are in contact with the plate surface of the inverter substrate 40 facing the other side in the axial direction.

The strut portions 12g are disposed inside the inverter housing portion 13. The strut portions 12g extend inside the inverter housing portion 13. The strut portions 12g are fixed to the inverter substrate 40. According to the embodiment, since the inverter substrate 40 is fixed to the strut portions 12g of the motor housing portion 12, attachment rigidity of the inverter substrate 40 with respect to the housing 11 can be increased, and the vibration damping performance of the inverter substrate 40 can be improved. Relative vibration between a stator 26 described later and the inverter substrate 40 can be suppressed, the stator 26 being fixed to the motor housing portion 12 by shrink fitting or the like. For this reason, durability of a solder 30 which fixes first end portions 29a of coils 29 described later of the stator 26 and the inverter substrate 40 can be enhanced. In addition, durability of solders 31 which fix terminals 51 described later of the wiring members 50 and the inverter substrate 40 is also enhanced.

In addition, according to the embodiment, the strut portions 12g extend in the axial direction from the collar portion 12b positioned closer to the radial outer side than the housing tube portion 12a, and support the inverter substrate 40. For this reason, even if the inverter substrate 40 has an external shape larger than the external shape of the housing tube portion 12a, the inverter substrate 40 can be stably supported by the strut portions 12g.

In addition, according to the embodiment, the inverter substrate 40 is more stably supported by the plurality of strut portions 12g. In addition, since the strut portions 12g are disposed on the outer peripheral portion of the inverter substrate 40, influence on a degree of freedom of a wiring pattern of the inverter substrate 40 can be suppressed. In addition, since the motor housing portion 12 is made of metal, the vibration damping performance of the inverter substrate 40 can be further improved by the motor housing portion 12 with high rigidity.

In addition, according to the embodiment, the strut portions 12g are parts of the motor housing portion 12 configured by a single member, that is, the strut portions 12g are arranged integrally with the motor housing portion 12, and thus sealability surrounding the strut portions 12g can be maintained well. Therefore, it is possible to prevent water or the like from entering the motor housing portion 12 and the inverter housing portion 13 from the outside of the device through the surrounding of the strut portions 12g. The configuration and the operational effects other than those described above of the strut portions 12g will be separately described later together with description of the inverter housing portion 13.

The oil seal 32 has an annular shape centered on the central axis J. The oil seal 32 is disposed inside the bearing holding tube portion 12d, and is positioned closer to the other side in the axial direction than the first bearings 35. The shaft portion 33 is a pin member extending in the axial direction. The shaft portion 33 is fitted into the shaft portion attachment hole 12m. The shaft portion 33 protrudes from the collar portion 12b toward the one side in the axial direction.

The inverter housing portion 13 houses the inverter substrate 40. In the embodiment, the inverter housing portion 13 also houses the coil supports 80. That is, the housing 11 also houses the coil supports 80. The inverter housing portion 13 is arranged on the one side in the axial direction of the collar portion 12b and overlaps the collar portion 12b when viewed from the axial direction. The inverter housing portion 13 has a first member 16, a second member 17, and heat conductive sheets 13c. In addition, the inverter housing portion 13 has the wiring member arrangement region 13a and a coil support housing space 13b.

The first member 16 may also be referred to as a lid member of the inverter housing portion 13. The first member 16 is made of metal. The first member 16 is disposed on the one side in the axial direction of the inverter substrate 40, and covers the inverter substrate 40 from the one side in the axial direction. The first member 16 faces one of the pair of plate surfaces of the inverter substrate 40. The first member 16 faces, in the axial direction, one plate surface facing the one side in the axial direction of the inverter substrate 40 with a gap therebetween. The first member 16 has a tubular shape with a top.

The first member 16 has a top wall 16a, a peripheral wall 16b, and a flange 16c. The top wall 16a faces one plate surface of the inverter substrate 40. The peripheral wall 16b has a tubular shape extending from an outer peripheral portion of the top wall 16a to the other side in the axial direction. The peripheral wall 16b is disposed overlapping the inverter substrate 40 when viewed from the radial direction. The flange 16c expands outward in the radial direction from an end portion of the peripheral wall 16b on the other side in the axial direction.

The second member 17 may also be referred to as a main body member of the inverter housing portion 13. The second member 17 is positioned between the motor housing portion 12 and the first member 16 in the axial direction. That is, the second member 17 is disposed between the motor housing portion 12 and the first member 16. The second member 17 is fixed to the collar portion 12b. The second member 17 is clapped between the collar portion 12b and the flange 16c in the axial direction and is fixed by the fastening screws 18. A plurality of the fastening screws 18 is arranged. The plurality of fastening screws 18 are arranged apart from each other in the circumferential direction. According to the embodiment, since the second member 17 is fixed to the collar portion 12b, a wide region for fixing the inverter housing portion 13 to the motor housing portion 12 can be ensured, and the inverter housing portion 13 can be stably fixed to the motor housing portion 12. In addition, the inverter housing portion 13 can be reduced in size in the axial direction while securing an internal volume of the inverter housing portion 13.

The second member 17 is disposed on the other side in the axial direction of the inverter substrate 40 and covers the inverter substrate 40 from the other side in the axial direction. The second member 17 faces the other plate surface of the pair of plate surfaces of the inverter substrate 40. The second member 17 faces, in the axial direction, the other plate surface of the inverter substrate 40 facing the other side in the axial direction with a gap therebetween. The second member 17 has a bottomed tubular shape.

The second member 17 has a bottom wall portion 17a and a peripheral wall portion 17b. That is, the inverter housing portion 13 has the bottom wall portion 17a and the peripheral wall portion 17b. The bottom wall portion 17a faces the other plate surface of the inverter substrate 40. That is, the bottom wall portion 17a faces the plate surface facing the other side in the axial direction of the pair of plate surfaces of the inverter substrate 40. The bottom wall portion 17a has a plate shape in which plate surfaces face the axial direction. The bottom wall portion 17a is fixed to the collar portion 12b by the fixing screws 19. That is, the second member 17 is fixed to the motor housing portion 12 by the fixing screws 19. A plurality of the fixing screws 19 is arranged. The plurality of fixing screws 19 is arranged apart from each other in the circumferential direction. The fixing screws 19 are used for the purpose of temporarily fixing the second member 17 to the motor housing portion 12 until the inverter housing portion 13 and the motor housing portion 12 are fastened by the fastening screws 18. Moreover, the temporary fixing refers to a temporary fixed state required for assembling. The number of the fixing screws 19 is smaller than the number of the fastening screws 18. Since the second member 17 is fixed to the motor housing portion 12 by the fixing screws 19, relative positions of the inverter substrate 40 fixed to the strut portions 12g of the motor housing portion 12 and the terminals 51 of the wiring members 50 held by a connector portion 17i described later of the second member 17 are stable, and the terminals 51 are connected to the inverter substrate 40 easily.

The bottom wall portion 17a has a bearing holder 17c, a wave washer 17g, a fitting tube portion 17d, through holes 17e, rib portions 17f, a pin portion 71, a boss portion 17j, an insertion hole 17k, a breather housing wall 17l, and a tube portion arrangement hole 17m. That is, the second member 17 has the bearing holder 17c, the through holes 17e, and the boss portion 17j. In addition, the pin portion 71 is arranged in the inverter housing portion 13.

The bearing holder 17c is made of metal. When the second member 17 is injection-molded, the bearing holder 17c is disposed in a mold not shown together with the other metal components. By filling the mold with molten resin and solidifying the molten resin, the second member 17 is insert-molded together with the bearing holder 17c. That is, the second member 17 has a part made of resin. According to the embodiment, since the second member 17 has a part made of resin, a degree of freedom of a shape of the second member 17 is increased. For this reason, the connector portion 17i described later and the like can be easily arranged in the second member 17.

The bearing holder 17c has a tubular shape with a top. The bearing holder 17c holds at least one bearing 36 among a plurality of bearings 35 and 36 described later of the motor 20. The bearing holder 17c holds the second bearings 36. The second bearings 36 are bearings positioned on the one side in the axial direction of the rotor core 23 described later, among the plurality of bearings 35 and 36. The second bearings 36 are fitted into the bearing holder 17c. That is, the bottom wall portion 17a holds at least one bearing 36. The bottom wall portion 17a may also be referred to as a bearing holding wall portion 55. That is, the housing 11 has the bearing holding wall portion 55. The bearing holding wall portion 55 is disposed on the one side in the axial direction of the stator 26 and is disposed on the other side in the axial direction of the inverter substrate 40. The bearing holding wall portion 55 is positioned between the stator 26 and the inverter substrate 40 in the axial direction. The bearing holding wall portion 55 has wall portion through holes 55a which penetrate the bearing holding wall portion 55 in the axial direction. A plurality of the wall portion through holes 55a may be arranged in the bearing holding wall portion 55.

The wave washer 17g has an annular shape centered on the central axis J. The wave washer 17g is disposed inside the bearing holder 17c and is positioned between a top wall portion of the bearing holder 17c and the second bearing 36 in the axial direction. The wave washer 17g is in contact with the top wall portion of the bearing holder 17c and the second bearing 36 in the axial direction. The wave washer 17g urges between the bearing holder 17c and the second bearing 36 in a direction in which the bearing holder 17c and the second bearing 36 are separated from each other in the axial direction.

The fitting tube portion 17d has a tubular shape extending from the bottom wall portion 17a toward the other side in the axial direction. The fitting tube portion 17d is fitted into the housing tube portion 12a. In the embodiment, the fitting tube portion 17d has a cylindrical shape and is fitted to the inner side of the end portion (the opening portion) of the housing tube portion 12a on the one side in the axial direction. According to the embodiment, the fitting tube portion 17d of the bottom wall portion 17a is fitted into the housing tube portion 12a of the motor housing portion 12, and thereby the bearings 36 held by the bearing holder 17c of the bottom wall portion 17a are aligned coaxially with the central axis J of the shaft 22. Therefore, performance of the motor 20 is stabilized.

The through holes 17e penetrate the bottom wall portion 17a in the axial direction. In the embodiment, the through holes 17e have a circular shape. A plurality of the through holes 17e is arranged. The plurality of through holes 17e is arranged apart from each other in the circumferential direction when viewed from the axial direction. Specifically, when viewed from the axial direction, that is, in the plan view of the inverter substrate 40, the plurality of through holes 17e is arranged apart from each other at positions overlapping an outer peripheral portion of the inverter substrate 40. The strut portions 12g are inserted into respective through holes 17e. That is, the strut portions 12g are inserted into the through holes 17e. According to the embodiment, sealability can be ensured easily between the inverter housing portion 13 and the motor housing portion 12 by passing the strut portions 12g through the through holes 17e of the second member 17. In addition, rough alignment of the inverter housing portion 13 and the motor housing portion 12 can be performed, and assemblability is improved.

Here, the strut portions 12g are described. The strut portions 12g penetrate the second member 17. The strut portions 12g penetrates the bottom wall portion 17a of the second member 17 in the axial direction. According to the embodiment, the strut portions 12g can be disposed inside the inverter housing portion 13 by a simple configuration. Then, the inverter substrate 40 can be supported by the strut portions 12g. The strut portions 12g are disposed inside the peripheral wall portion 17b when viewed from the axial direction. The strut portions 12g protrude farther toward the one side in the axial direction than the peripheral wall portion 17b when viewed from the radial direction. According to the embodiment, the inverter substrate 40 supported by tip portions of the strut portions 12g is arranged closer to the one side in the axial direction than the peripheral wall portion 17b of the second member 17. That is, the other plate surface of the inverter substrate 40 is positioned closer to the one side in the axial direction than the peripheral wall portion 17b. For this reason, when the first end portions 29a of the coils 29 or the terminals 51 described later are soldered to the inverter substrate 40, whether or not the solders 30 and 31 are properly wrapped around the other plate surface of the inverter substrate 40, that is, whether or not the soldering is performed satisfactorily can be easily confirmed by visual observation from the radial direction.

The rib portions 17f protrude from the plate surface of the bottom wall portion 17a facing the one side in the axial direction toward the one side in the axial direction, and extend along an unillustrated virtual plane perpendicular to the central axis J. A plurality of rib portions 17f is arranged. The plurality of rib portions 17f extends radially centered on the central axis J. In the embodiment, the plurality of rib portions 17f includes rib portions 17f extending in the radial direction and rib portions 17f extending in directions other than the radial direction when viewed from the axial direction. The plurality of rib portions 17f is arranged apart from each other in the circumferential direction. End portions on the radial outer side of the rib portions 17f are connected to the peripheral wall portion 17b. End surfaces of the rib portions 17f facing the one side in the axial direction are positioned closer to the other side in the axial direction than an end surface of the peripheral wall portion 17b facing the one side in the axial direction.

The pin portion 71 extends in the axial direction. The pin portion 71 extends from the bottom wall portion 17a toward the one side in the axial direction. In the embodiment, the pin portion 71 is arranged integrally with one of the rib portions 17f among the plurality of rib portions 17f. That is, the pin portion 71 and one of the rib portions 17f are parts of a single member. The pin portion 71 is positioned between a radial inner end portion and a radial outer end portion of the one rib portion 17f.

The pin portion 71 is inserted into a positioning hole portion 43 described later of the inverter substrate 40. An end portion of the pin portion 71 on the one side in the axial direction is inserted into the positioning hole portion 43. The end portion of the pin portion 71 on the one side in the axial direction protrudes farther toward the one side in the axial direction than the end surfaces of the strut portions 12g on one side in the axial direction. The pin portion 71 faces at least one strut portion 12g among the plurality of strut portions 12g with a gap therebetween when viewed from the axial direction. That is, the pin portion 71 is disposed close to at least one strut portion 12g with a gap therebetween when viewed from the axial direction. An outer diameter of the pin portion 71 gradually decreases from the bottom wall portion 17a toward the one side in the axial direction. According to the embodiment, the inverter substrate 40 and the inverter housing portion 13 can be aligned by inserting the pin portion 71 into the positioning hole portion 43 of the inverter substrate 40. In addition, when the inverter substrate 40 is fixed to the strut portions 12g with the screw members 60, the inverter substrate 40 can be suppressed from rotating with the screw members 60, and the inverter substrate 40 can be suppressed from rotating with respect to the inverter housing portion 13.

The boss portion 17j protrudes from the bottom wall portion 17a toward the one side in the axial direction. The boss portion 17j extends in the axial direction. The boss portion 17j has a tubular shape or a columnar shape. In the embodiment, the boss portion 17j has a cylindrical shape. In the boss portion 17j, a front surface of the boss portion 17j facing the one side in the axial direction has a planar shape perpendicular to the central axis J. The front end surface of the boss portion 17j is in contact with or faces, with a gap therebetween, the other plate surface of the inverter substrate 40. The boss portion 17j can support the other plate surface of the inverter substrate 40. In the plan view of the inverter substrate 40, the boss portion 17j is disposed at the center of the inverter substrate 40. In the plan view of the inverter substrate 40, the bearing holder 17c and the boss portion 17j are arranged to overlap each other.

The insertion hole 17k is recessed from the surface of the bottom wall portion 17a facing the other side in the axial direction toward the one side in the axial direction. The insertion hole 17k extends in the axial direction. The insertion hole 17k overlaps the shaft portion attachment hole 12m and the shaft portion 33 when viewed from the axial direction. The shaft portion 33 is inserted into the insertion hole 17k. According to the embodiment, the second member 17 is positioned in the radial direction with respect to the motor housing portion 12 by fitting the fitting tube portion 17d into the housing tube portion 12a. In addition, the second member 17 is positioned in the circumferential direction with respect to the motor housing portion 12 by inserting the shaft portion 33 into the insertion hole 17k. In this way, relative positions of the motor housing portion 12 and the inverter housing portion 13 are determined stably, and the first end portions 29a of the coils 29 or the terminals 51 described later can be easily connected to the inverter substrate 40. In addition, when viewed from the axial direction, the shaft portion 33 and the pin portion 71 are arranged to overlap each other. According to the embodiment, since the shaft portion 33 and the pin portion 71 are disposed coaxially, space saving of an alignment structure using the shaft portion 33 and the pin portion 71 can be achieved.

The breather housing wall 17l is recessed from the surface of the bottom wall portion 17a facing the other side in the axial direction toward the one side in the axial direction. The breather housing wall 17l has a tubular shape with a top. The breather housing wall 17l has a peripheral wall and a top wall. The peripheral wall of the breather housing wall portion 17l extends from the bottom wall portion 17a toward the one side in the axial direction. The top wall of the breather housing wall 17l blocks an opening of the peripheral wall of the breather housing wall 17l on the one side in the axial direction. The breather housing wall 17l overlaps the breather attachment hole 12i when viewed from the axial direction. The tube portion arrangement hole 17*m* penetrates the bottom wall portion 17*a* in the axial direction. Extension tube portions 85*b* described later of the coil supports 80 are arranged inside the tube portion arrangement hole 17*m*.

The peripheral wall portion 17*b* has a tubular shape extending from an outer peripheral portion of the bottom wall portion 17*a* toward the one side in the axial direction. In the embodiment, the peripheral wall portion 17*b* has a substantially polygonal tubular shape. The peripheral wall portion 17*b* has spacers 17*h* and the connector portion 17*i*. That is, the inverter housing portion 13 has the connector portion 17*i*.

The spacers 17*h* have a tubular shape extending in the axial direction. In the embodiment, the spacers 17*h* have a cylindrical shape. The spacers 17*h* are arranged on the peripheral wall portion 17*b* and penetrate the second member 17 in the axial direction. A plurality of the spacers 17*h* is arranged. The plurality of spacers 17*h* are arranged apart from each other in the circumferential direction. The fastening screws 18 are respectively inserted into respective spacers 17*h*. The spacers 17*h* are made of metal. When the second member 17 is injection molded, the spacers 17*h* are disposed inside a mold not shown together with the other metal components. By filling the mold with molten resin and solidifying the molten resin, the second member 17 is insert-molded together with the spacers 17*h*.

An external power supply not shown is connected to the connector portion 17*i*. The connector portion 17*i* has a tubular shape. In the embodiment, the connector portion 17*i* has a quadrangular tubular shape. The connector portion 17*i* extends from the peripheral wall portion 17*b* toward the outside of the peripheral wall portion 17*b* when viewed from the axial direction. The connector portion 17*i* protrudes outward from the peripheral wall portion 17*b* along an unillustrated virtual plane perpendicular to the central axis J. In the embodiment, a direction in which the connector portion 17*i* protrudes from the peripheral wall portion 17*b* may be referred to as a protrusion direction. The protrusion direction of the connector portion 17*i* is the +X side. An opposite side of the protrusion direction is the −X side. In addition, a direction orthogonal to the protrusion direction when viewed from the axial direction may be referred to as a width direction. The width direction is the Y-axis direction. The connector portion 17*i* is disposed at a position different from the central axis J in the width direction. In the width direction, a direction from the central axis J toward the connector portion 17*i* is referred to as one side in the width direction (the +Y side), and a direction from the connector portion 17*i* toward the central axis J is referred to as the other side in the width direction (the −Y side).

The connector portion 17*i* and the peripheral wall portion 17*b* are parts of a single member. A portion of the wiring members 50 is disposed inside the connector portion 17*i*. The connector portion 17*i* is fixed to the wiring members 50. The connector portion 17*i* holds the wiring members 50.

The wiring member arrangement region 13*a* is a space in the inverter housing portion 13 where the wiring members 50 are arranged. The wiring member disposition region 13*a* is positioned between the central axis J and the connector portion 17*i* in the protrusion direction in the plan view of the inverter substrate 40 in an internal space of the inverter housing portion 13. That is, the wiring member arrangement region 13*a* is positioned between the central axis J and the connector portion 17*i* when viewed from the axial direction. The wiring member arrangement region 13*a* is positioned closer to the protrusion direction (the +X side) than the central axis J, and is positioned closer to the opposite side (the −X side) of the protrusion direction than the connector portion 17*i*.

The coil support housing space 13*b* is disposed inside the inverter housing portion 13. The coil support housing space 13*b* houses the coil supports 80. The coil support housing space 13*b* is a space in the internal space of the inverter housing portion 13 in which the coil supports 80 are disposed. The coil support housing space 13*b* has an annular shape centered on the central axis J. The coil support housing space 13*b* overlaps the stator 26 when viewed from the axial direction. The coil support housing space 13*b* is positioned on the radial inner side of the fitting tube portion 17*d*. The coil support housing space 13*b* is a groove-like space which extends in the circumferential direction and is recessed from the surface of the bottom wall portion 17*a* facing the other side in the axial direction toward the one side in the axial direction.

The heat conductive sheets 13*c* have a plate shape, and a pair of plate surfaces faces the axial direction. The heat conductive sheets 13*c* are elastic sheet members. The heat conductive sheets 13*c* have, for example, a quadrangular plate shape. The heat conductive sheets 13*c* are disposed between the first member 16 or the second member 17 and the inverter substrate 40, and are in contact with the first member 16 or the second member 17 and the inverter substrate 40. In the embodiment, the heat conductive sheets 13*c* are disposed between the first member 16 and the inverter substrate 40, and are in contact with the first member 16 and the inverter substrate 40. Specifically, the heat conductive sheets 13*c* are disposed between the top wall 16*a* and one plate surface of the inverter substrate 40, and are in contact with the top wall 16*a* and the one plate surface of the inverter substrate 40. Although not particularly illustrated, when the heat conductive sheets 13*c* are disposed between the second member 17 and the inverter substrate 40 and are in contact with the second member 17 and the inverter substrate 40, the heat conductive sheets 13*c* are arranged between an unillustrated metal part (a metal member) or the like of the bottom wall portion 17*a* and the other plate surface of the inverter substrate 40, and are in contact with the metal part or the like of the bottom wall portion 17*a* and the other plate surface of the inverter substrate 40. The heat conductive sheets 13*c* are thermally connected to heat generating elements 46 described later of the inverter substrate 40. The heat conductive sheets 13*c* have a function of cooling the heat generating elements 46 by transferring heat of the heat generating elements 46 to other members by heat conduction. Other configurations and operational effects of the heat conductive sheets 13*c* are separately described later together with description of the inverter substrate 40.

The breather portion 14 communicates the inside and the outside of the housing 11. The breather portion 14 is arranged on the collar portion 12*b* of the motor housing portion 12 and is exposed to the outside of the device from the housing 11 toward the other side in the axial direction. That is, the breather portion 14 is disposed on the collar portion 12*b*. The collar portion 12*b* is covered from the one side in the axial direction by the inverter housing portion 13, and faces the other side in the axial direction, that is, a member side of the vehicle not shown to which the electric pump device 1 is fixed. For this reason, the collar portion 12*b* is surrounded by the inverter housing portion 13 and the members of the vehicle in the axial direction. According to the embodiment, water droplets and the like scattered due to traveling of the vehicle and the like can be prevented from being directly applied to the breather portion 14. Therefore, the members inside the housing 11 are unlikely to come into contact with water or the like, and the function of the inverter substrate 40, the motor 20, or the like is satisfactorily maintained.

The breather portion 14 is disposed at a position not overlapping leg portions 97 described later of a pump cover 95 when viewed from the axial direction. According to the embodiment, since the breather portion 14 does not overlap the leg portions 97 in the axial direction, for example, the seal function of the housing 11 is easily inspected from an attachment location of the breather portion 14, that is, the breather attachment hole 12*i* of the collar portion 12*b*. That is, it is easy to attach/remove a fixture or the like of an inspection device not shown to/from the breather attachment hole 12*i*. In addition, it is easy to attach the breather portion 14 to the breather attachment hole 12*i* after the inspection.

The breather portion 14 is arranged at a position overlapping the wiring member arrangement region 13*a* of the collar portion 12*b* when viewed from the axial direction. In the embodiment, the breather portion 14 is arranged closer to the other side in the width direction (the −Y side) than the central axis J in the wiring member arrangement region 13*a*. Moreover, the breather portion 14 may be arranged closer to the one side in the width direction (the +Y side) than the central axis J in the wiring member arrangement region 13*a*. Since the wiring member arrangement region 13*a* houses the wiring members 50, a wide space is easily ensured. According to the embodiment, the breather portion 14 is arranged at a position overlapping the wiring member arrangement region 13*a* in the collar portion 12*b* when viewed from the axial direction, and thus an empty space of the housing 11 can be used effectively, and the electric pump device 1 can be reduced in size by optimizing arrangement of the configuration members of the device.

Although not particularly illustrated, the breather portion 14 is disposed above the center of the electric pump device 1 in a vertical direction in a state that the electric pump device 1 is attached to the member of the vehicle. For this reason, submergence of the breather portion 14 can be suppressed. In addition, high-temperature air inside the housing 11 can be easily released to the outside of the device through the breather portion 14. A fact that the breather portion 14 is disposed above the center of the electric pump device 1 in the vertical direction can also be explained using a relative positional relationship between an inflow port 96*a* and an outflow port 96*b* described later of the pump cover 95. The description is described later together with description of the pump cover 95.

The breather portion 14 has a breather body 14*a*, a breather tube portion 14*b*, claw portions 14*c*, and a breather seal member 14*e*. The breather body 14*a* has a disc shape having an internal space. In the following description, a central axis of the breather body 14*a* is referred to as a breather central axis C. The breather central axis C extends parallel to the central axis J, that is, extends in the axial direction. A radial direction centered on the breather central axis C is referred to as a breather radial direction. Of the breather radial directions, a direction approaching the breather central axis C is referred to as an inner side of the breather radial direction, and a direction away from the breather central axis C is referred to as an outer side of the breather radial direction. A circumferential direction centered on the breather central axis C, that is, a direction around the breather central axis C is referred to as a breather circumferential direction.

A surface of the breather body 14*a* facing the one side in the axial direction faces, in the axial direction, the bottom surface of the breather housing recess 12*j* facing the other side in the axial direction with a gap therebetween. An outer peripheral surface of the breather body 14*a* faces, in the breather radial direction, the inner peripheral surface of the breather housing recess 12*j* with a gap therebetween. The breather body 14*a* has a part which is housed inside the breather housing recess 12*j*.

The breather body 14*a* has breathing holes 14*d*. The breathing holes 14*d* communicate with the outside of the housing 11. The breathing holes 14*d* communicate with the internal space of the breather body 14*a*. A plurality of the breathing holes 14*d* is arranged apart from each other in the breather circumferential direction. The plurality of breathing holes 14*d* includes breathing holes 14*d* extending in the breather radial direction and breathing holes 14*d* extending in the axial direction. The plurality of breathing holes 14*d* includes breathing holes 14*d* which are opened on an outer peripheral surface of the breather body 14*a* and breathing holes 14*d* which are opened on a surface of the breather body 14*a* facing the one side in the axial direction.

The breather tube portion 14*b* has a tubular shape extending in the axial direction. The breather tube portion 14*b* is connected to the breather body 14*a*. The breather tube portion 14*b* is connected to a surface of the breather body 14*a* facing the one side in the axial direction and extends from the breather body 14*a* toward the one side in the axial direction. The breather tube portion 14*b* is inserted into the breather attachment hole 12*i*. The breather tube portion 14*b* communicates with the breathing holes 14*d* through the internal space of the breather body 14*a*. That is, the breather tube portion 14*b* communicates with the breathing holes 14*d*. The breather tube portion 14*b* communicates with the inside of the inverter housing portion 13 through the through holes 17*e* and the like of the bottom wall portion 17*a*. That is, the breather tube portion 14*b* communicates with the inside of the housing 11.

The claw portions 14*c* protrude outward in the breather radial direction from an end portion of the breather tube portion 14*b* on the one side in the axial direction. A plurality of the claw portions 14*c* are arranged apart from each other in the circumferential direction. The claw portions 14*c* are in contact with the collar portion 12*b* from the one side in the axial direction. The claw portions 14*c* are in contact with the claw portion support surface 12*k* of the collar portion 12*b* from the one side in the axial direction. That is, the claw portions 14*c* are in contact with the claw portion support surface 12*k*. The claw portions 14*c* are hooked to the claw portion support surface 12*k* by a snap-fit structure or the like. According to the embodiment, the claw portion support surface 12*k* is arranged closer to the one side in the axial direction than the outside surrounding surface 12*l*, and thus the claw portion support surface 12*k* can be easily processed with a cutting tool or the like. In this way, an axial position or accuracy of the processed surface of the claw portion support surface 12*k* is ensured. Then, the claw portions 14*c* can be stably hooked on the claw portion support surface 12*k*. In addition, a fixed state of the breather portion 14 with respect to the collar portion 12*b* is further stabilized.

Here, the breather housing wall 17*l* houses an end portion of the breather tube portion 14*b* on the one side in the axial direction and the claw portions 14*c*, and covers the breather tube portion 14*b* from the one side in the axial direction. A top wall of the breather housing wall 17*l* faces, from the one side in the axial direction, the end portion of the breather tube portion 14*b* on one side in the axial direction and the claw portions 14c with a gap therebetween. A peripheral wall of the breather housing wall 17l faces, from the outside of the breather radial direction, the end portion of the breather tube portion 14b on one side in the axial direction and the claw portions 14c with a gap therebetween. According to the embodiment, even when water or the like enters the housing 11 from the outside of the device through the breather portion 14, the breather housing wall portion 17l can suppress water or the like from being directly applied to the electronic components or the like inside the housing 11.

The breather seal member 14e is, for example, an O-ring or the like. The breather seal member 14e is in contact with the outer peripheral surface of the breather tube portion 14b, the surface of the breather body 14a facing the one side in the axial direction, and the inner peripheral surface of the breather attachment hole 12i. According to the embodiment, the breather seal member 14e suppresses water or the like from entering the housing 11 from between the breather tube portion 14b and the breather attachment hole 12i. In addition, the attachment state of the breather portion 14 to the collar portion 12b is further stabilized.

The motor 20 includes a rotor 21, the stator 26, and the plurality of bearings 35 and 36. The rotor 21 includes a shaft 22, the rotor core 23, magnets 24, and magnet holders 25.

The shaft 22 extends along the central axis J. The shaft 22 extends in the axial direction centered on the central axis J. The shaft 22 rotates around the central axis J. The shaft 22 is rotatably supported around the central axis J by the plurality of bearings 35 and 36. That is, the plurality of bearings 35 and 36 support the shaft 22 so that the shaft 22 is rotatable. The plurality of bearings 35 and 36 are, for example, ball bearings. Of the plurality of bearings 35 and 36, the first bearings 35 support a part of the shaft 22 positioned closer to the other side in the axial direction than the rotor core 23. Of the plurality of bearings 35 and 36, the second bearings 36 support a part of the shaft 22 positioned closer to the one side in the axial direction than the rotor core 23.

The rotor core 23 is fixed to an outer peripheral surface of the shaft 22. The rotor core 23 has an annular shape which extends in the circumferential direction centered on the central axis J. The rotor core 23 has a tubular shape extending in the axial direction. The rotor core 23 is, for example, a steel plate laminate configured by laminating a plurality of electromagnetic steel plates in the axial direction.

The magnets 24 are disposed on a radial outer surface of the rotor core 23. A plurality of the magnets 24 is arranged. The plurality of magnets 24 is arranged apart from each other in the circumferential direction on the radial outer surface of the rotor core 23. Moreover, the magnet 24 may be, for example, a cylindrical ring magnet.

The magnet holders 25 are arranged on the rotor core 23 and hold the magnets 24. The magnet holders 25 fix the magnets 24 to the rotor core 23. The magnet holders 25 are disposed on a radial outer surface of the rotor core 23 and the surface facing the other side in the axial direction of the rotor core 23. The magnet holders 25 hold the magnets 24 from the radial outer side and the other side in the axial direction. The magnet holders 25 have parts which are positioned between a pair of magnets 24 adjacent in the circumferential direction and extend in the axial direction, and parts which have an annular shape centered on the central axis J and are positioned on the other side in the axial direction of the magnets 24.

The stator 26 is disposed on the radial outer side of the rotor 21 and faces the rotor 21 with a gap therebetween in the radial direction. That is, the stator 26 faces the rotor 21 in the radial direction. The stator 26 surrounds the rotor 21 from the radial outer side over the entire circumference in the circumferential direction. The stator 26 includes a stator core 27, an insulator 28, and a plurality of coils 29.

The stator core 27 has an annular shape centered on the central axis J. The stator core 27 surrounds the rotor 21 on the radial outer side of the rotor 21. The stator core 27 is disposed on the radial outer side of the rotor 21 and faces the rotor 21 in the radial direction with a gap therebetween. The stator core 27 is, for example, a steel plate laminate configured by laminating a plurality of electromagnetic steel plates in the axial direction.

The stator core 27 includes a core back 27a and a plurality of teeth 27b. The core back 27a has an annular shape centered on the central axis. The core back 27a has a tubular shape extending in the axial direction. A radial outer surface of the core back 27a is fixed to the inner peripheral surface of the housing tube portion 12a. The teeth 27b extend from a radial inner surface of the core back 27a toward the radial inner side.

The plurality of teeth 27b is disposed apart from each other in the circumferential direction on the radial inner surface of the core back 27a. Radial inside surfaces of the teeth 27b face radial outer surfaces of the magnets 24 from the radial outer side with a gap therebetween.

The insulator 28 is mounted to the stator core 27. The insulator 28 has a part which covers the plurality of teeth 27b. The material of the insulator 28 is, for example, an insulating material such as a resin or the like. The coils 29 are attached to the stator core 27. The coils 29 are mounted to the stator core 27 via the insulator 28. The plurality of coils 29 are respectively configured by winding conductive wires around each tooth 27b via the insulator 28.

Although not particularly illustrated, the plurality of coils 29 include first coils and second coils. The first coils have first conductive wires. The second coils have second conductive wires different from the first conductive wires. That is, the first coils and the second coils have different phases. In the embodiment, the motor 20 is a three-phase motor. The three phases are U phase, V phase and W phase. In the case of the three-phase motor, conductive wires configuring the U-phase coil 29, the V-phase coil 29, and the W-phase coil 29 are different from each other. That is, conductive wires of the U-phase coil 29, conductive wires of the V-phase coil 29, and conductive wires of the W-phase coil 29 are different from each other. For example, when the first coils are U-phase, the second coils are either V-phase or W-phase. When the second coils are U-phase, the first coils are either V-phase or W-phase.

The coil 29 has a pair of end portions drawn out from the coils 29 at both ends of the conducting wires of the coils 29. The pair of end portions are the first end portion 29a and second end portion 29b. The end portions 29a and 29b of the conducting wire of the coil 29 may also be referred to as drawn portions of the coil 29. The first portions 29a are directly connected to the inverter substrate 40. The second ends 29b are connected to neutral point bus bars 81 described later of the coil supports 80.

Figure 9:
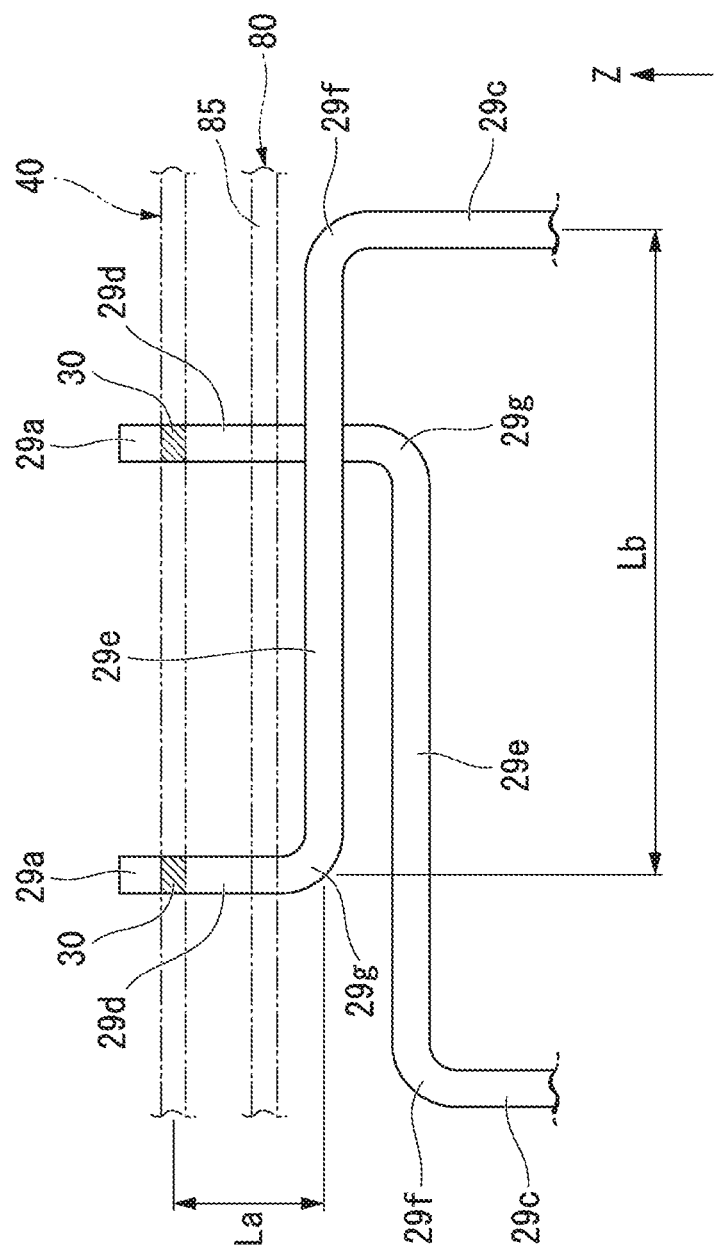
FIG. 9 is a side view schematically showing the vicinity of a first end portion of a coil.

The first end portion 29a includes a first extending portion 29c, a second extending portion 29d, and a third extending portion 29e (see FIG. 9). The first extending portion 29c extends from the coil 29 to the one side in the axial direction. The second extending portion 29d is connected to the inverter substrate 40 and extends in the axial direction. The second extending portion 29d is joined to the inverter substrate 40 using the solder 30. The third extending portion 29e is connected to one end of the first extending portion 29c in the axial direction and the other end of the second extending portion 29d in the axial direction, and extends in a direction intersecting with the central axis J. That is, in the embodiment, the first end portion 29a of the coil 29 has a plurality of bent portions 29f and 29g. Specifically, the first end portion 29a has the bent portion 29f positioned at a connection part between the first extension portion 29c and the third extension portion 29e, and the bent portion 29g at a connection part between the second extension portion 29d and the third extension portion 29e. For this reason, when vibration from the outside or inside of the device is transmitted to the first extending portion 29c, the vibration is attenuated in the process from the first extending portion 29c to the second extending portion 29d via the third extending portion 29e. Specifically, at least amplitude of the axial component of the vibration is reduced and transmitted to the inverter substrate 40. In this way, load on the solder 30 which joins the second extending portion 29d and the inverter substrate 40 is reduced, and the durability of the solder 30 is improved.

In the first end portion 29a, a length Lb of the conducting wire of the third extending portion 29e is longer than a length La of the conducting wire of the second extending portion 29d between the inverter substrate 40 and the third extending portion 29e. According to the embodiment, an effect of attenuating the vibration in the first end portion 29a of the coil 29 is further enhanced. The durability of the solder 30 which joins the first end portion 29a and the inverter substrate 40 is further improved.

Two first end portions 29a shown in FIG. 9 are a first end portion 29a of the first coil and a first end portion 29a of the second coil. That is, the two first end portions 29a shown in FIG. 9 have phases different from each other. When viewed from the axial direction, the third extending portion 29e of the first coil and the third extending portion 29e of the second coil overlap each other, and the third extending portion 29e of the first coil and the third extending portion 29e of the second coil are disposed away from each other in the axial direction. According to the embodiment, since the two third extending portions 29e overlap each other when viewed from the axial direction, a length with which each first end portion 29a is drawn around in the direction intersecting with the central axis J can be kept short, and the first end portions 29a having phases different from each other can be suppressed from contacting each other in the axial direction. Thereby, the performance of the motor 20 is maintained satisfactorily.

The inverter substrate 40 is disposed on the one side in the axial direction of the motor 20. The inverter substrate 40 is electrically connected to an external power source not shown via the wiring members 50. The inverter substrate 40 is electrically connected to the motor 20. The inverter substrate 40 supplies power supplied from the external power source to the stator 26 of the motor 20. The inverter substrate 40 controls current supplied to the motor 20.

The inverter substrate 40 has a polygonal shape in the plan view of the inverter substrate 40, and has a plurality of corner portions 45a, 45b, etc. In the embodiment, the inverter substrate 40 has a substantially pentagonal shape in the plan view of the inverter substrate 40, and the inverter substrate 40 has five corner portions 45a, 45b, etc. In the embodiment, among the plurality of corner portions 45a, 45b, etc., a corner portion which is positioned, in the plan view of the inverter substrate 40, on the one side in the width direction (the +Y side) and in the protrusion direction (the +X side) of the inverter substrate 40 is referred to as the first corner portion 45a. The first corner portion 45a is positioned closer to the one side in the width direction than the central axis J and in the protrusion direction. In addition, the second corner portion 45b is a corner portion which is positioned on the other side in the width direction (the −Y side) of the inverter substrate 40 and on the opposite side (the −X side) of the protrusion direction in the plan view of the inverter substrate 40. The second corner portion 45b is positioned closer to the other side in the width direction than the central axis J and on the opposite side of the protrusion direction. A third corner portion is positioned closer to the other side in the width direction than the central axis J and in the protrusion direction in the plan view of the inverter substrate 40. A fourth corner and a fifth corner are positioned closer to the one side in the width direction than the central axis J and on the opposite side of the protrusion direction in the plan view of the inverter substrate 40.

The inverter substrate 40 includes a plurality of the heat generating elements 46, capacitors 47, drawn portion insertion holes 48, terminal insertion holes 41, screw insertion holes 42, and the positioning hole portion 43. In addition, the inverter substrate 40 has a coil connection region 40a and a terminal connection region 40b. The plurality of heat generating elements 46 is mounted on the inverter substrate 40 and are arranged apart from each other. The heat generating elements 46 are, for example, field effect transistors (FET), pre-drivers, low drop-out linear regulators (LDO) and the like. In the embodiment, the heat generating elements 46 are disposed on the other plate surface of the inverter substrate 40.

Here, the heat conductive sheets 13c are described. In the embodiment, a plurality of the heat conductive sheets 13c are arranged. That is, the inverter housing portion 13 has a plurality of heat conductive sheets 13c. In the plan view of the inverter substrate 40, the plurality of heat conductive sheets 13c are individually disposed at positions overlapping the plurality of heat generating elements 46. In the embodiment, each heat conductive sheet 13c overlaps one heat generating element 46 in the plan view of the inverter substrate 40. That is, one heat conductive sheet 13c is disposed overlapping one heat generating element 46. When viewed from the axial direction, the heat conductive sheet 13c and the heat generating elements 46 are overlapped one to one.

For example, compared with a configuration which is different from the embodiment and in which one heat conductive sheet having a large area is brought into contact with all the heat generating elements 46, according to the embodiment, contact places between the heat conductive sheets 13c and the inverter substrate 40 are dispersed and an contact area is reduced. Thereby, a reaction force of the heat conductive sheets 13c is reduced, and deformation of the inverter substrate 40 is suppressed. Besides, performance of electronic components such as ceramic capacitors or the like mounted on the inverter substrate 40 is maintained satisfactorily. In addition, the durability of the solders 30 which join the first end portions 29a of the coils 29 and the inverter substrate 40 is further improved. The durability of the solders 31 for fixing the inverter substrate 40 and the terminals 51 described later of the wiring members 50 is further improved.

Figure 10:
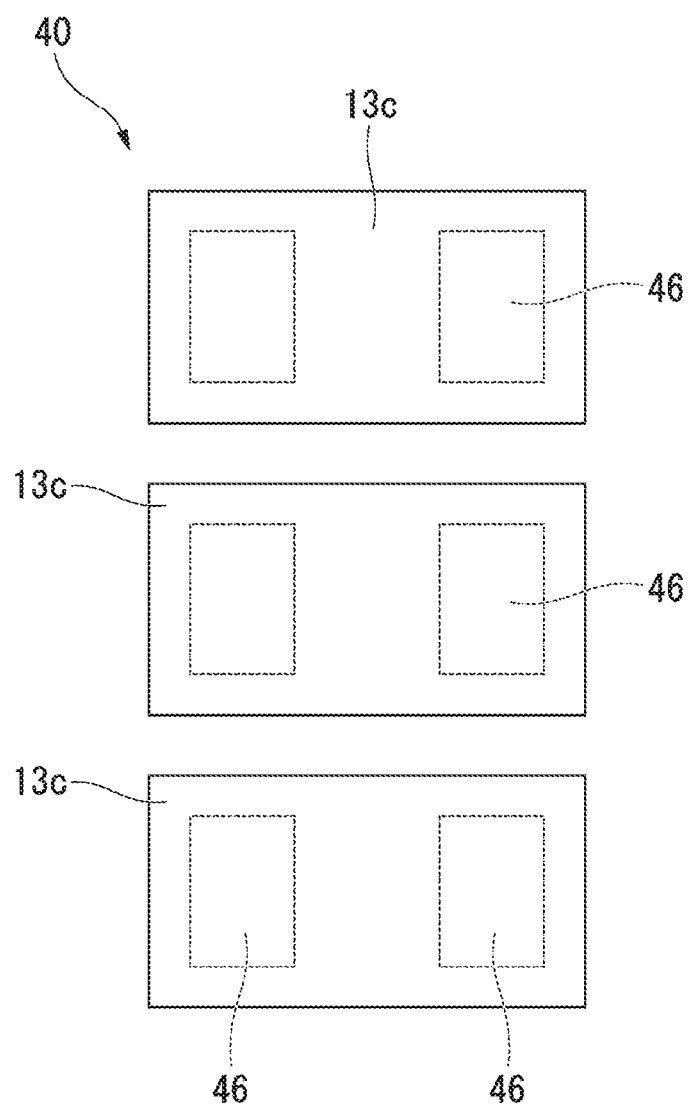
FIG. 10 is a plan view showing a modification example of a heat conductive sheet.

Here, FIG. 10 shows a modification example of the heat conductive sheets 13c of the embodiment. In this modification example, each heat conductive sheet 13c overlaps two heat generating elements 46 in the plan view of the inverter substrate 40. That is, one heat conductive sheet 13c is disposed overlapping two heat generating elements 46. In this case, the contact portions between the heat conductive sheets 13c and the inverter substrate 40 are also dispersed and the contact area is reduced, and thus the deformation of the inverter substrate 40 is suppressed.

At least one of the plurality of heat conductive sheets 13c is disposed between the first member 16 and the inverter substrate 40 and is in contact with the first member 16 and the inverter substrate 40. In the embodiment, all of the plurality of heat conductive sheets 13c are disposed between the first member 16 and the inverter substrate 40 and in contact with the first member 16 and the inverter substrate 40. According to the embodiment, when the second member 17 is attached to the motor housing portion 12 and the first member 16 is attached to the second member 17, that is, when the assembly of the inverter housing portion 13 is finished, the heat conductive sheets 13c are in contact with the inverter substrate 40. When the heat conductive sheets 13c are in contact with the inverter substrate 40, the inverter substrate 40 can be supported between the first member 16 and the second member 17 from both sides in the axial direction, and the deformation of the inverter substrate 40 is suppressed more easily.

According to the embodiment, when the first member 16 is attached to the second member 17 and the heat conductive sheets 13c press one plate surface of the inverter substrate 40, the boss portion 17j supports the other plate surface of the inverter substrate 40. For this reason, the deformation of the inverter substrate 40 is further suppressed. In addition, in the embodiment, the boss portion 17j is supported from the axial direction by the bearing holder 17c made of metal. For this reason, the inverter substrate 40 is stably supported by the boss portion 17j, and the deformation of the inverter substrate 40 is further suppressed.

Moreover, although not particularly illustrated, at least one of the plurality of heat conductive sheets 13c may be disposed between the second member 17 and the inverter substrate 40 and in contact with the second member 17 and the inverter substrate 40.

The capacitors 47 are one of a plurality of electronic components mounted on the inverter substrate 40. The capacitors 47 are disposed on the other plate surface of the inverter substrate 40. The capacitors 47 extend from the other plate surface of the inverter substrate 40 toward the other side in the axial direction. The capacitors 47 have a circular columnar shape extending in the axial direction. In the embodiment, a plurality of the capacitors 47 are arranged. When viewed from the axial direction, the capacitors 47 are disposed overlapping the coil supports 80. The capacitors 47 may also be referred to as electronic components 47. That is, the inverter substrate 40 has the electronic components 47. The electronic components 47 protrude from the plate surface of the inverter substrate 40 facing the other side in the axial direction toward the other side in the axial direction.

The drawn portion insertion holes 48 penetrate the inverter substrate 40 in a plate thickness direction of the inverter substrate 40 (in the axial direction). That is, the drawn portion insertion holes 48 penetrate the inverter substrate 40. A plurality of the drawn portion insertion holes 48 is arranged. In the embodiment, the plurality of drawn portion insertion holes 48 is arranged linearly in the plan view of the inverter substrate 40. The plurality of drawn portion insertion holes 48 is arranged at the end portion on the other side in the width direction of the inverter substrate 40 and are aligned in the protrusion direction. The first end portions 29a of the coils 29 are respectively inserted into respective drawn portion insertion holes 48. The first end portions 29a of the coils 29 are joined to the inverter substrate 40 by the solders 30.

The terminal insertion holes 41 penetrate the inverter substrate 40 in the plate thickness direction of the inverter substrate 40. That is, the terminal insertion holes 41 penetrate the inverter substrate 40. A plurality of the terminal insertion holes 41 is arranged. In the embodiment, the plurality of terminal insertion holes 41 is arranged linearly in the plan view of the inverter substrate 40. The plurality of terminal insertion holes 41 is arranged at the end portion in the protrusion direction (the +X side) of the inverter substrate 40 and are aligned in the width direction (the Y-axis direction). The terminal insertion holes 41 are disposed in the first corner portion 45a. In other words, of the plurality of corner portions 45a, 45b . . . of the inverter substrate 40, a corner portion where the terminal insertion holes 41 are positioned is the first corner portion 45a. The terminals 51 described later of the wiring members 50 are inserted into respective terminal insertion holes 41. The terminals 51 are joined to the inverter substrate 40 by the solders 31.

The screw insertion holes 42 penetrate the inverter substrate 40 in the plate thickness direction of the inverter substrate 40. That is, the screw insertion holes 42 penetrate the inverter substrate 40. The screw insertion holes 42 are disposed overlapping female screw portions of the strut portions 12g in the plan view of the inverter substrate 40, that is, when viewed from the axial direction. A plurality of the screw insertion holes 42 is arranged in the inverter substrate 40. When viewed from the axial direction, each screw insertion hole 42 is disposed overlapping the female screw portion of each strut portion 12g.

The screw insertion holes 42 are arranged at the plurality of corner portions 45a, 45b . . . of the inverter substrate 40. At least one of the plurality of screw insertion holes 42 is disposed at the first corner portion 45a. In the embodiment, two screw insertion holes 42 are disposed in the first corner portion 45a. In the plan view of the inverter substrate 40, the terminal insertion holes 41 are disposed between the two screw insertion holes 42 of the first corner 45a. The terminal insertion holes 41 are positioned between the two screw insertion holes 42 in the width direction.

The positioning hole portion 43 penetrates the inverter substrate 40 in the plate thickness direction of the inverter substrate 40. That is, the positioning hole portion 43 penetrates the inverter substrate 40 in the axial direction. In the embodiment, one positioning hole portion 43 is arranged in the inverter substrate 40. The positioning hole portion 43 is disposed at a corner portion of the inverter substrate 40 in the plan view of the inverter substrate 40. The positioning hole portion 43 is disposed in the first corner portion 45a. The positioning hole portion 43 is disposed between the terminal insertion holes 41 and an outer peripheral end surface of the inverter substrate 40 in the plan view of the inverter substrate 40. In the embodiment, the positioning hole portion 43 is disposed between the terminal insertion holes 41 and the outer peripheral end surface of the inverter substrate 40 facing the one side in the width direction in the width direction.

The positioning hole portion 43 faces, in the plan view of the inverter substrate 40, one screw insertion hole 42 of the two screw insertion holes 42 of the first corner 45a in the protrusion direction with a gap therebetween, the one screw insertion hole 42 being positioned closer to the one side in the width direction than the terminal insertion holes 41. That is, in the plan view of the inverter substrate 40, the screw insertion holes 42 of the first corner 45a and the positioning hole portion 43 face each other with a gap therebetween.

The coil connection region 40a is a region where the end portions 29a of the plurality of coils 29 are connected to the inverter substrate 40. In the embodiment, the coil connection region 40a is arranged closer to the other side in the width direction (the −Y side) than the central axis J in the plan view of the inverter substrate 40. A plurality of the heat generating elements 46 is arranged in the coil connection region 40a. Specifically, a plurality of heat generating elements such as FETs or the like is arranged in the coil connection region 40a. According to the embodiment, since the end portions 29a of the plurality of coils 29 connected to the inverter substrate 40 and the plurality of heat generating elements 46 are arranged approaching each other, the wiring pattern of the inverter substrate 40 can be shortened. Besides, each heat generating element 46 can be individually and efficiently cooled by each heat conductive sheet 13c.

The terminal connection area 40b is a region where the terminals 51 described later of the wiring members 50 are connected to the inverter substrate 40. In the embodiment, in the plan view of the inverter substrate 40, the terminal connection region 40b is arranged closer to the one side in the width direction (the +Y side) than the central axis J and in the protrusion direction (the +X side). The terminal connection area 40b is positioned at the first corner 45a. At least one heat generating element 46 is disposed in the terminal connection region 40b. In the embodiment, a plurality of the heat generating elements 46 is disposed in the terminal connection region 40b. Specifically, in the terminal connection region 40b, for example, heat generating elements such as FETs for reverse connection protection or LDOs are disposed. According to the embodiment, since the terminals 51 connected to the inverter substrate 40 and the heat generating elements 46 are disposed approaching each other, the wiring pattern of the inverter substrate 40 can be shortened. Besides, the heat generating elements 46 can be individually and efficiently cooled by the heat conductive sheets 13c.

The wiring members 50 extend over the outside and the inside of the second member 17 through the connector portion 17i. That is, the wiring members 50 extend over the outside and the inside of the housing 11. The wiring members 50 are electrically connected to the external power source not shown. The wiring members 50 are electrically connected to the inverter substrate 40. In the embodiment, the wiring members 50 are elongated plates made of metal. The wiring members 50 may also be referred to as bus bars. A plurality of the wiring members 50 is arranged.

The wiring members 50 have the terminals 51 positioned at end portions of the wiring members 50. The terminals 51 are respectively arranged in respective wiring members 50. That is, a plurality of the terminals 51 is arranged. The terminal 51 is positioned at one end portion disposed inside the housing 11 of the two end portions of the wiring members 50. In the embodiment, the wiring members 50 are single members, and the terminals 51 configure a portion of the wiring members 50. The terminals 51 extend in the axial direction inside the inverter housing portion 13. The terminals 51 are arranged at the first corner portion 45a of the inverter substrate 40 in the plan view of the inverter substrate 40. The terminals 51 are inserted into the terminal insertion holes 41. The terminals 51 are connected to the inverter substrate 40 using the solders 31.

A plurality of the screw members 60 is arranged. The screw members 60 are inserted into the screw insertion holes 42. The screw members 60 have male screw portions. The male screw portions of the screw members 60 inserted into the screw insertion holes 42 are screwed to the female screw portions of the strut portions 12g. That is, the screw members 60 are inserted into the screw insertion holes 42 to be fixed to the strut portions 12g. The screw members 60 fix the inverter substrate 40 to the housing 11.

At least two screw members 60 of the plurality of screw members 60 are disposed in the terminal connection region 40b. The terminals 51 are positioned between the two screw members 60 in the plan view of the inverter substrate 40. Specifically, the terminals 51 are disposed between the two screw members 60 in the width direction. According to the embodiment, relative movement of the inverter substrate 40 and the terminals 51 due to thermal deformation, vibration, or the like can be suppressed, and the durability of the solders 31 which fix the inverter substrate 40 and the terminals 51 is enhanced.

The coil supports 80 are positioned between the motor 20 and the inverter substrate 40 in the axial direction. That is, the coil supports 80 are disposed between the motor 20 and the inverter substrate 40. In the embodiment, the coil supports 80 are positioned between the bottom wall portion 17a, that is, the bearing holding wall portion 55, and the stator 26 in the axial direction. The coil supports 80 support the first end portions 29a of the coils 29 between the motor 20 and the inverter substrate 40. The coil supports 80 guide the first end portions 29a of the coils 29 toward the inverter substrate 40 in the axial direction. In addition, the coil supports 80 support the second end portions 29b of the coils 29. The coil supports 80 support the second end portions 29b by the neutral point bus bars 81 described later. The coil supports 80 electrically connect the second end portions 29b of the plurality of coils 29 to each other by the neutral point bus bars 81. That is, the neutral point bus bars 81 electrically connect the plurality of coils 29 to each other.

The coil supports 80 are housed in the coil support housing space 13b. The coil support housing space 13b, the coil supports 80, and the bearings 36 are disposed overlapping each other when viewed from the radial direction. According to the embodiment, the electric pump device 1 can be further reduced in size in the axial direction. The coil support 80 has a double tubular shape with a top. The coil support 80 includes an inner tube, an outer tube, and a top wall. The inner tube has a cylindrical shape extending in the axial direction. The outer tube has a cylindrical shape extending in the axial direction and surrounds the inner tube from the radial outer side. The top wall has a plate shape in which plate surfaces face the axial direction. The top wall has a substantially annular plate shape. An inner peripheral portion of the top wall is connected to the inner tube. An outer peripheral portion of the top wall is connected to the outer tube. The coil supports 80 are disposed overlapping the stator 26 when viewed from the axial direction. The coil supports 80 are disposed overlapping the plurality of coils 29 when viewed from the axial direction.

The neutral point bus bars 81 are made of metal. When the coil supports 80 are injection-molded, the neutral point bus bars 81 are disposed in a mold not shown. The coil supports 80 are insert-molded together with the neutral point bus bars 81 by filling the mold with molten resin and solidifying the molten resin. That is, the coil supports 80 have parts made of resin.

The neutral point bus bars 81 include coil end holding portions 81a and holding portion connecting bars 81b. The coil end holding portions 81a hold the second end portions 29b of the coils 29. The coil end holding portions 81a have a V shape when viewed from the axial direction. A plurality of the coil end holding portions 81a is arranged. The plurality of coil end holding portions 81a is disposed apart from each other in the circumferential direction. The coil end holding portions 81a are disposed between the inner tubes and the outer tubes of the coil supports 80 in the radial direction. The holding portion connecting bars 81b are embedded in the inner tubes of the coil supports 80. The holding portion connecting bars 81b have a plate shape in which plate surfaces face the axial direction and extend in the circumferential direction. The holding portion connecting bars 81b are connected to the plurality of coil end holding portions 81a. The holding portion connecting bars 81b electrically connect the plurality of coil end holding portions 81a to each other.

The coil supports 80 have first regions 80a and second regions 80b. When viewed from the axial direction, each of the first regions 80a and the second regions 80b is a semicircular region (see FIG. 7). In the first regions 80a, the first end portions 29a of the coils 29 are disposed. In the second regions 80b, the second end portions 29b of the coils 29 and the neutral point bus bars 81 are disposed. According to the embodiment, the first end portions 29a disposed in the first regions 80a of the coil supports 80 are directly connected to the inverter substrate 40. That is, since the bus bar members which connect the end portions of the coils and the inverter substrate as before are not used, according to the embodiment, the motor 20 and the inverter substrate 40 can be disposed further approaching the axial direction. Therefore, the electric pump device 1 can be reduced in size in the axial direction. In addition, the number of components can be reduced, and manufacturing cost is reduced.

The coil supports 80 have first wall portions 85 and second wall portions 86. The first wall portions 85 and the second wall portions 86 respectively configure one part of the top walls of the coil supports 80. The first wall portions 85 are disposed in the first regions 80a. Plate surfaces of the first wall portions 85 face the axial direction. The first wall portions 85 include coil end insertion holes 85a, the extension tube portions 85b, and window portions 85c.

The coil end insertion holes 85a penetrate the first wall portions 85 in the axial direction. The coil end insertion holes 85a have a circular-hole shape. The first end portions 29a are inserted into the coil end insertion holes 85a. A plurality of the coil end insertion holes 85a is arranged. The plurality of coil end insertion holes 85a are arranged in the protrusion direction (the X-axis direction) in the first wall portions 85. The extension tube portion 85b has a tubular shape extending from the plate surface of the first wall portion 85 facing the one side in the axial direction toward the one side in the axial direction. The interior of the extension tube portion 85b is a part of the coil end insertion hole 85a. A plurality of the extension tube portions 85b is arranged. The plurality of extension tube portions 85b is arranged in the protrusion direction in the first wall portions 85. In the embodiment, with respect to a pair of the extension tube portions 85b adjacent to each other, a part of an outer peripheral surface of each extension tube portion 85b is connected to each other.

According to the embodiment, the coil end insertion holes 85a can be lengthened toward the one side in the axial direction by the extension tube portions 85b. For this reason, the coil end insertion holes 85a can guide the first end portions 29a of the coils 29 closer to the inverter substrate 40. Therefore, the first end portions 29a are easily connected to the inverter substrate 40. In addition, as axial distances for the coil end insertion holes 85a guiding the first end portions 29a become longer, insulation of the first end portions 29a is ensured easily. In addition, the extension tube portions 85b are arranged inside the tube portion arrangement hole 17m of the bottom wall portion 17a. According to the embodiment, the electric pump device 1 can be further reduced in size in the axial direction.

The window portions 85c penetrate the first wall portions 85 in the axial direction. That is, the coil supports 80 have the window portions 85c which penetrate the coil supports 80 in the axial direction. The window portions 85c overlap drawn-around portions positioned on the other side in the axial direction of the first wall portions 85 in the first end portions 29a when viewed from the axial direction. The drawn-around portions are, for example, the third extending portions 29e. A plurality of the window portions 85c is arranged. In at least one of the plurality of window portions 85c, each drawn-around portion of the plurality of coils 29 overlaps each other in the window portions 85c when viewed from the axial direction. According to the embodiment, the drawn-around portions of the first end portions 29a drawn around to the other side in the axial direction of the first wall portions 85 can be visually recognized through the window portions 85c. For this reason, the first end portions 29a can be stably drawn around. In addition, at least one of the plurality of window portions 85c overlaps the wall portion through holes 55a when viewed from the axial direction. That is, the wall portion through holes 55a and the window portions 85c are disposed overlapping each other when viewed from the axial direction. The wall portion through holes 55a and the window portions 85c are disposed adjacent to each other in the axial direction.

Here, one of the problems to be solved by the disclosure is described. In recent years, an electric pump device has been required in which rotation accuracy and rotation output of a motor and a pump portion are improved. In connection with this, there is a problem that the electronic components mounted in the inverter substrate are enlarged and an external shape of the electric pump device is enlarged. In view of the above circumstances, the disclosure provides an electric pump device in which the external shape can be reduced in size while the rotation accuracy and the rotation output of the motor and the pump portion are improved.

The electronic components 47 are inserted into at least one of the wall portion through holes 55a and the window portions 85c. The electronic components 47 have at least one of parts positioned in the wall portion through holes 55a and parts positioned in the window portions 85c. In the embodiment, the electronic components 47 are inserted into the wall portion through holes 55a and the window portions 85c. That is, the electronic components 47 have parts positioned in the wall portion through holes 55a and parts positioned in the window portions 85c. The electronic components 47 overlap the wall portion through holes 55a and the window portions 85c when viewed from the radial direction. The electronic components 47 overlap the wall portion through holes 55a and the window portions 85c when viewed from the circumferential direction. According to the embodiment, the external shape of the electric pump device 1 can be reduced in size in the axial direction by inserting the electronic components 47 into at least one of the wall portion through holes 55a and the window portions 85c.

The second wall portions 86 are disposed in the second regions 80b. Plate surfaces of the second wall portions 86 face the axial direction. The second wall portions 86 have coil end drawing holes 86a. The coil end drawing holes 86a penetrate the second wall portions 86 in the axial direction. The second end portions 29b are passed through the coil end drawing holes 86a. That is, the second end portions 29b are drawn out to the one side in the axial direction through the coil end drawing holes 86a. A plurality of the coil end drawing holes 86a is arranged. The plurality of coil end drawing holes 86a is arranged apart from each other in the circumferential direction. When viewed from the axial direction, the coil end drawing holes 86a and the coil end holding portions 81a overlap each other. The second wall portions 86 are positioned closer to the other side in the axial direction than the coil end holding portions 81a.

Axial positions of the first wall portions 85 are closer to the one side in the axial direction than axial positions of the second wall portions 86. In the embodiment, the first wall portions 85 support the first end portions 29a by the coil end insertion holes 85a and the extension tube portions 85b. Since the first wall portions 85 are disposed closer to the inverter substrate 40 in the axial direction than the second wall portions 86, the first end portions 29a supported by the first wall portions 85 can be stably connected to the inverter substrate 40.

Connection parts between the neutral point bus bars 81 and the second end portions 29b, that is, the coil end holding portions 81a are disposed closer to the other side in the axial direction than plate surfaces of the first wall portions 85 facing the one side in the axial direction, and are disposed closer to the one side in the axial direction than plate surfaces of the second wall portions 86 facing the one side in the axial direction. According to the embodiment, the coil supports 80 can be reduced in size in the axial direction, and the electric pump device 1 can be reduced in size in the axial direction.

The pump portion 90 is driven by the power of the motor 20. The pump portion 90 sucks and discharges fluid such as oil or the like. The pump portion 90 is disposed on the other side in the axial direction of the motor 20. The pump portion 90 is positioned on the part of the electric pump device 1 on the other side in the axial direction. Although not particularly illustrated, the pump portion 90 is connected to a flow path of the fluid such as oil or the like arranged in a vehicle drive device or the like. For this reason, a part on the other side in the axial direction in which the pump portion 90 is positioned in the electric pump device 1 is fixed to members of the vehicle.

In the embodiment, the pump portion 90 has a trochoid pump structure. The pump portion 90 has an inner rotor 91 and an outer rotor 92. The inner rotor 91 and the outer rotor 92 respectively have a trochoid tooth profile. The inner rotor 91 is fixed to an end portion of the shaft 22 on the other side in the axial direction. Moreover, relative rotation around the central axis J of the inner rotor 91 and the shaft 22 may be allowed within a predetermined range. The outer rotor 92 is disposed on the radial outer side of the inner rotor 91. The outer rotor 92 surrounds the inner rotor 91 from the radial outer side over the entire circumference in the circumferential direction.

The pump cover 95 is fixed to the end portion of the motor housing portion 12 on the other side in the axial direction and covers the pump portion 90 from the other side in the axial direction. That is, the pump cover 95 is fixed to the housing 11 and covers the pump portion 90. The pump cover 95 is fixed to the members of the vehicle not shown. A surface of the pump cover 95 facing the other side in the axial direction is in contact with the members of the vehicle. The pump cover 95 has a cover portion 96 and the leg portions 97.

The cover portion 96 is disposed overlapping the pump portion 90 when viewed from the axial direction, and covers the pump portion 90 from the other side in the axial direction. That is, the cover portion 96 covers the pump portion 90. The cover portion 96 has the inflow port 96a and the outflow port 96b. The inflow port 96a and the outflow port 96b are respectively connected to the pump portion 90. The inflow port 96a is configured by a through hole which penetrates the cover portion 96 in the axial direction. The inflow port 96a allows the fluid to flow into the pump portion 90. That is, the pump portion 90 sucks the fluid from the outside of the device through the inflow port 96a. The outflow port 96b is configured by a through hole which penetrates the cover portion 96 in the axial direction. The outflow port 96b allows the fluid to flow out from the pump portion 90. That is, the pump portion 90 discharges the fluid to the outside of the device through the outflow port 96b. In the embodiment, when viewed from the axial direction, the inflow port 96a and the outflow port 96b are aligned in the protrusion direction.

When viewed from the axial direction, a direction from the inflow port 96a to the outflow port 96b is defined as a fluid feeding direction. The breather portion 14 is arranged closer to the fluid feeding direction than the central axis J when viewed from the axial direction (see FIG. 2). In the embodiment, the fluid feeding direction is the +X side and is the same direction as the protrusion direction. Therefore, the protrusion direction (the +X side) may also be referred to as the fluid feeding direction, and the opposite side of the protrusion direction (the −X side) may also be referred to as an opposite side of the fluid feeding direction. When the electric pump device 1 is mounted on the vehicle, the inflow port 96a is disposed below the fluid level in the vertical direction so that, for example, air stagnation of the fluid does not occur. The outflow port 96b is disposed above the inflow port 96a in the vertical direction. That is, the fluid feeding direction is a direction including an upper side of the vertical direction. According to the embodiment, since the breather portion 14 is disposed above the center of the electric pump device 1 in the vertical direction, the breather portion 14 can be prevented from being submerged. In addition, hot air inside the housing 11 can be easily released outside the device through the breather portion 14.

The leg portions 97 are connected to the cover portion 96 and are disposed on the radial outer side of the cover portion 96. The leg portions 97 protrude further toward the radial outer side than the housing tube portion 12a. A plurality of the leg portions 97 is aligned in the circumferential direction. The breather portion 14 is disposed between a pair of leg portions 97 adjacent to each other in the circumferential direction when viewed from the axial direction. Bolt insertion holes 97a are respectively arranged at outer end portions of each leg portion 97 in the radial direction. The bolt insertion holes 97a penetrate the leg portions 97 in the axial direction. The electric pump device 1 is fixed to the members of the vehicle using bolt members not shown which are inserted into the bolt insertion holes 97a.

Figure 11:
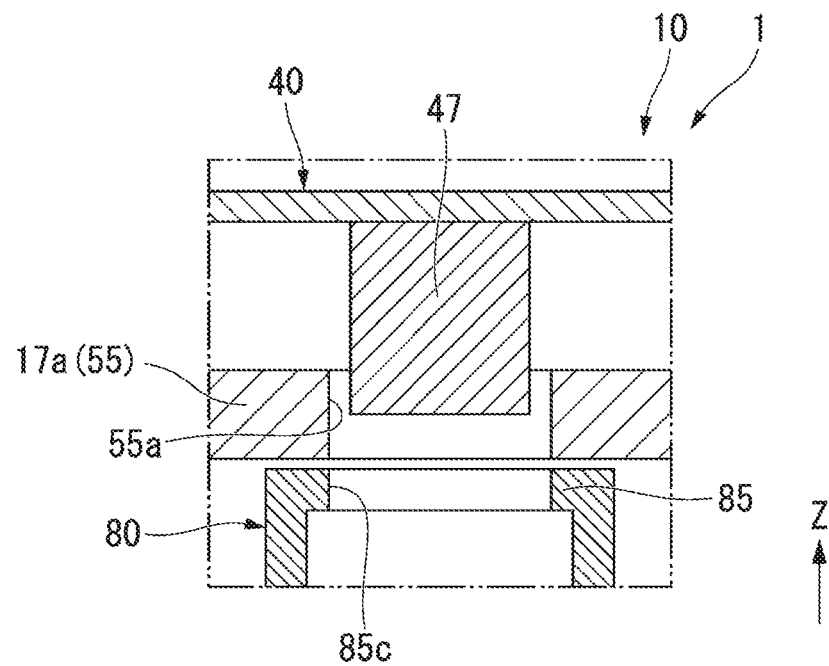
FIG. 11 is a longitudinal section view showing a part of a motor unit and an electric pump device of a first modification example of the first embodiment.

FIG. 11 is a longitudinal section view showing a part of the motor unit 10 and the electric pump device 1 according to a first modification example of the first embodiment. In the first modification example, the electronic components 47 are inserted into either the wall portion through holes 55a or the window portions 85c. In the illustrated example, the electronic component 47 is inserted into the wall portion through hole 55a. That is, the electronic components 47 have parts positioned in the wall through holes 55a. The electronic components 47 overlap the wall portion through holes 55a when viewed from the radial direction. The electronic components 47 overlap the wall portion through holes 55a when viewed from the circumferential direction.

Figure 12:
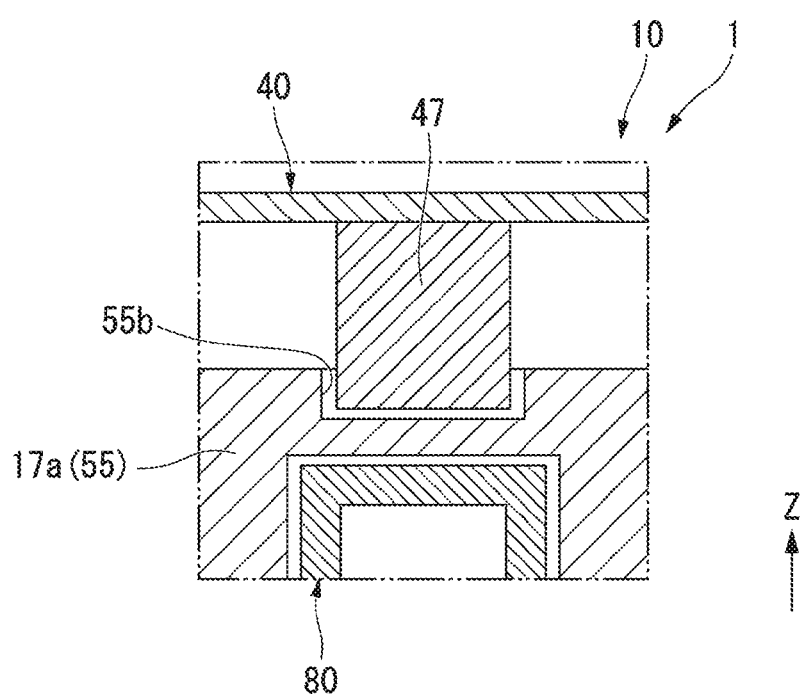
FIG. 12 is a longitudinal section view showing a part of a motor unit and an electric pump device of a second modification example of the first embodiment.

FIG. 12 is a longitudinal section view showing a part of the motor unit 10 and the electric pump device 1 of the second modification example of the first embodiment. In the second modification example, the bottom wall portion 17a, that is, the bearing holding wall portion 55 has recesses 55b which are recessed from the surface of the bearing holding wall portion 55 facing the one side in the axial direction toward the other side in the axial direction. The recesses 55b are bottomed holes, for example, circular holes or the like extending in the axial direction. The electronic components 47 are inserted into the recesses 55b. The electronic components 47 have parts positioned inside the recesses 55b. The electronic components 47 overlap the recesses 55b when viewed from the radial direction. The electronic components 47 overlap the recesses 55b when viewed from the circumferential direction. According to the second modification example, the external shape of the electric pump device 1 can be reduced in size in the axial direction by inserting the electronic components 47 into the recesses 55b. Moreover, in the second modification example, the coil supports 80 may not be arranged.

Second Embodiment

Figure 13:
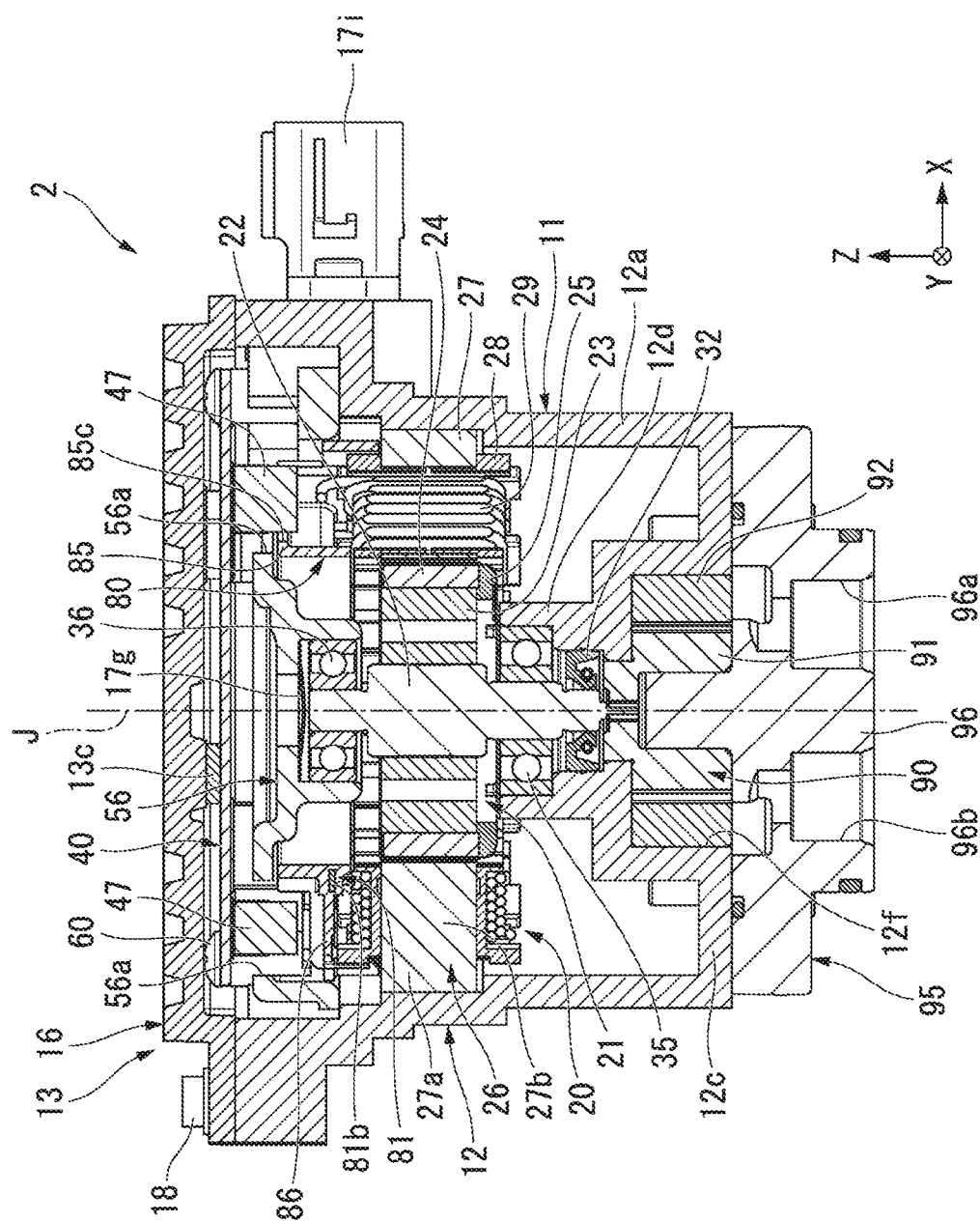
FIG. 13 is a longitudinal section view showing a motor unit and an electric pump device of a second embodiment.

Next, an electric pump device 2 according to a second embodiment of the disclosure is described with reference to FIG. 13. Moreover, in the second embodiment, the same components as those in the first embodiment are denoted by the same reference numerals, and description thereof is omitted.

The electric pump device 2 of the embodiment is different from the electric pump device 1 described in the first embodiment in the configuration of the housing 11 and the like. In the embodiment, an opening portion of a motor housing portion 12 on one side in the axial direction is in direct contact with an outer peripheral portion of a first member 16. Fastening screws 18 fix the motor housing portion 12 and the first member 16.

In the embodiment, the housing 11 has a bearing holding wall portion 56. The bearing holding wall portion 56 is made of metal. The bearing holding wall portion 56 is configured by a single member. The bearing holding wall portion 56 is disposed on the one side in the axial direction of a stator 26 and is disposed on the other side in the axial direction of an inverter substrate 40 to hold at least one bearing 36. The bearing holding wall portion 56 may also be referred to as a bearing holder. An outer peripheral portion of the bearing holding wall portion 56 is fixed in the opening portion of the motor housing portion 12 on the one side in the axial direction by a screw member or the like. According to the embodiment, rigidity of the bearing holding wall portion 56 is enhanced, coaxiality between a shaft 22 supported by the bearings 36 and the stator 26 fitted into the motor housing portion 12 is ensured, and performance of the motor 20 is stabilized. In addition, the structure of the bearing holding wall portion 56 is simplified.

The bearing holding wall portion 56 has wall portion through holes 56a which penetrate the bearing holding wall portion 56 in the axial direction. A plurality of the wall portion through holes 56a is arranged in the bearing holding wall portion 56. At least one of the plurality of wall portion through holes 56a overlaps window portions 85c when viewed from the axial direction. That is, the wall portion through holes 56a and the window portions 85c are disposed overlapping each other when viewed from the axial direction. Electronic components 47 are inserted into at least one of the wall portion through holes 56a and the window portions 85c. According to the embodiment, an external shape of the electric pump device 2 can be reduced in size in the axial direction by inserting the electronic components 47 into at least one of the wall portion through holes 56a and the window portions 85c.

Moreover, the disclosure is not limited to the above-described embodiments. For example, as described below, the configuration can be changed in a range not departing from the spirit of the disclosure.

In the above-described embodiments, the protrusion direction and the width direction are defined in directions along the unillustrated virtual plane perpendicular to the central axis J, but the disclosure is not limited hereto. For example, a direction parallel to the protrusion direction may be referred to as a "first direction" regardless of a direction in which the connector portion 17i protrudes from the peripheral wall portion 17b. That is, the first direction is a predetermined direction among the directions along the virtual plane perpendicular to the central axis J. In this case, one side of the first direction (+X side) corresponds to the protrusion direction, and the other side of the first direction (−X side) corresponds to the opposite side of the protrusion direction. In addition, the width direction may also be referred to as a "second direction". That is, the second direction is a direction orthogonal to the first direction among the directions along the virtual plane perpendicular to the central axis J. In this case, one side of the second direction (+Y side) corresponds to the one side in the width direction, and the other side of the second direction (−Y side) corresponds to the other side in the width direction. Similarly, the fluid feeding direction may also be referred to as the "first direction".

In addition, in the above-described embodiments, the capacitors 47 are described as an example of the electronic components 47, but the disclosure is not limited hereto. The electronic components 47 may be electronic components other than the capacitors 47.

In addition, in a range not departing from the spirit of the disclosure, each configuration (configuration component) described in the above embodiments, the modification examples, notes, and the like may be combined; in addition, addition, omission, substitution and other changes of the configurations are possible. In addition, the disclosure is not limited by the above-described embodiments, but is limited only by the scope of the claims.

What is claimed is:
1. An electric pump device, comprising:
a motor;
an inverter substrate electrically connected to the motor;
a housing for housing the motor and the inverter substrate; and
a pump portion driven by power of the motor; wherein
the housing comprises:
a motor housing portion for housing the motor; and
an inverter housing portion for housing the inverter substrate,
wherein the motor housing portion comprises at least one strut portion fixed to the inverter substrate and extending in the inverter housing portion,
an end surface of the at least one strut portion facing one side in an axial direction is in contact with a plate surface of the inverter substrate facing the other side in the axial direction, wherein the inverter housing portion comprises:
a first member facing one plate surface of a pair of plate surfaces of the inverter substrate; and
a second member facing the other plate surface of the pair of plate surfaces,
wherein the second member is disposed between the motor housing portion and the first member, and
the strut portion penetrates the second member.

2. The electric pump device according to claim 1, wherein the at least one strut portion comprises a plurality of strut portions, and
in a plan view of the inverter substrate, the plurality of strut portions is disposed apart from each other at positions overlapping an outer peripheral portion of the inverter substrate.

3. The electric pump device according to claim 1, wherein the motor housing portion is made of metal.

4. The electric pump device according to claim 1, wherein the motor housing portion is configured by a single member.

5. The electric pump device according to claim 1, wherein the second member has a through hole into which the strut portion is inserted.

6. The electric pump device according to claim 1, wherein the second member has a part made of resin and is fixed to the motor housing portion by a fixing screw.

7. The electric pump device according to claim 1, wherein the motor comprises:
a rotor having a shaft extending along a central axis, and
a stator facing the rotor in a radial direction;
the motor and the inverter substrate are aligned in an axial direction;
the strut portion extends in the axial direction;
the second member comprises:
a bottom wall portion facing the other plate surface of the inverter substrate, and
a tubular peripheral wall portion extending from an outer peripheral portion of the bottom wall portion toward one side in the axial direction;
the strut portion is disposed inside the peripheral wall portion when viewed from the axial direction; and
the strut portion protrudes closer to the one side in the axial direction than the peripheral wall portion when viewed from the radial direction.

8. The electric pump device according to claim 1, wherein the motor housing portion houses the pump portion.

9. The electric pump device according to claim 1, wherein the motor comprises:
a rotor having a shaft extending along a central axis, and
a stator facing the rotor in a radial direction;
the motor and the inverter substrate are aligned in an axial direction;
the motor housing portion comprises:
a housing tube portion in which the motor is housed, and
a collar portion extending outward in the radial direction from an end portion of the housing tube portion on one side in the axial direction; and
the strut portion is arranged at the collar portion and extend from the collar portion toward the one side in the axial direction.

10. The electric pump device according to claim 9, wherein
the second member is fixed to the collar portion.

11. The electric pump device according to claim 10, wherein
the housing has a shaft portion that protrudes from the collar portion toward the one side in the axial direction;
the second member has a bottom wall portion facing the other plate surface of the inverter substrate; and
the bottom wall portion comprises:
a fitting tube portion extending from the bottom wall portion toward the other side in the axial direction and fitted into the housing tube portion; and
an insertion hole which is recessed from a surface of the bottom wall portion facing the other side in the axial direction to the one side in the axial direction and into which the shaft portion is inserted.

12. The electric pump device according to claim 7, wherein
the motor has a plurality of bearings that supports the shaft so that the shaft is rotatable; and
the bottom wall portion has a bearing holder that holds at least one of the plurality of bearings.

13. The electric pump device according to claim 7, wherein
the inverter substrate has a positioning hole portion that penetrates the inverter substrate in the axial direction;
the bottom wall portion has a pin portion that extends from the bottom wall portion toward the one side in the axial direction and is inserted into the positioning hole portion;
the housing has a shaft portion that protrudes from the collar portion toward the one side in the axial direction; and
when viewed from the axial direction, the shaft portion and the pin portion are disposed overlapping each other.

* * * * *